US011656405B2

(12) United States Patent
Oguma et al.

(10) Patent No.: US 11,656,405 B2
(45) Date of Patent: May 23, 2023

(54) OPTICAL MULTI/DEMULTIPLEXING CIRCUIT

(71) Applicant: Nippon Telegraph and Telephone Corporation, Tokyo (JP)

(72) Inventors: Manabu Oguma, Musashino (JP); Osamu Moriwaki, Musashino (JP); Kenya Suzuki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/631,794

(22) PCT Filed: Aug. 1, 2019

(86) PCT No.: PCT/JP2019/030249
§ 371 (c)(1),
(2) Date: Jan. 31, 2022

(87) PCT Pub. No.: WO2021/019766
PCT Pub. Date: Feb. 4, 2021

(65) Prior Publication Data
US 2022/0269001 A1    Aug. 25, 2022

(51) Int. Cl.
G02B 6/12      (2006.01)
G02B 6/293     (2006.01)

(52) U.S. Cl.
CPC ...... *G02B 6/12011* (2013.01); *G02B 6/12016* (2013.01); *G02B 6/12019* (2013.01); *G02B 6/29358* (2013.01); *G02B 6/29361* (2013.01)

(58) Field of Classification Search
None
See application file for complete search history.

(56) References Cited

U.S. PATENT DOCUMENTS 5,488,680 A    1/1996  Dragone
6,144,783 A   11/2000  Epworth et al.
(Continued)

FOREIGN PATENT DOCUMENTS

JP    2000-515993 T    1/2000
JP    3256418 A       11/2001
(Continued)

OTHER PUBLICATIONS

K. Maru, et al., *Demonstration of Flat-Passband Multi/Demultiplexer Using Multi-Input Arrayed Waveguide Grating Combined with Cascaded Mach-Zehnder Interferometers*, J. Lightwave Technol. vol. 25, No. 8, Aug. 2007, pp. 2187-2197.
E. Kapon, et al., *Supermode Analysis of Phase-Locked Arrays of Semiconductor Lasers*, Opt. Lett. vol. 10, No. 4, (1984), pp. 125-127.
(Continued)

*Primary Examiner* — Jerry Rahll
(74) *Attorney, Agent, or Firm* — Workman Nydegger

(57) ABSTRACT

Provided is an optical wavelength multi/demultiplexing circuit with a high rectangular transmission loss spectrum that is able to secure loss flatness of a transmission band, maintain/reduce a guard bandwidth of wavelength channel spacing, and broaden a transmission bandwidth. The circuit uses a multimode waveguide for a connecting part between a field modulation device and an AWG. The field modulation device is constituted by a common input waveguide, an optical branching unit, optical delay lines, a multiplex interference unit, and a mode converter/multiplexer.

8 Claims, 26 Drawing Sheets

(56) References Cited

U.S. PATENT DOCUMENTS

| | | | |
|---|---|---|---|
| 6,587,615 | B1 | 7/2003 | Paiam |
| 7,433,560 | B2 | 10/2008 | Doerr |
| 8,295,661 | B2 | 10/2012 | Little |
| 8,483,525 | B2 | 7/2013 | Kitoh et al. |
| 2002/0097961 | A1* | 7/2002 | Kazarinov ......... G02B 6/12011 385/129 |
| 2003/0223694 | A1* | 12/2003 | Nikonov ............ G02B 6/29352 385/27 |
| 2011/0064355 | A1* | 3/2011 | Soma ................. G02B 6/12019 385/38 |
| 2011/0110624 | A1* | 5/2011 | Kamei ............... G02B 6/12016 385/24 |
| 2012/0170891 | A1 | 7/2012 | Kitoh et al. |

FOREIGN PATENT DOCUMENTS

| | | |
|---|---|---|
| JP | 3931834 B2 | 3/2007 |
| JP | 4100489 B2 | 3/2008 |
| JP | 5106405 B2 | 10/2012 |
| JP | 5180322 B2 | 1/2013 |
| JP | 5462270 B2 | 1/2014 |

OTHER PUBLICATIONS

M. Oguma et al., *Ultrawide-Passband Tandem MZI-Synchronized AWG and Group Delay Ripple Balancing Out Technique*, European Conf. Optical Communication (ECOC), 2010, Paper We.8.E.2 pp. 1-3.

\* cited by examiner

OPTICAL MULTI/DEMULTIPLEXING CIRCUIT

TECHNICAL FIELD

The present invention relates to an optical wavelength multi/demultiplexing circuit that uses an Arrayed Waveguide Grating (hereinafter, AWG) and has a wide transmission bandwidth.

BACKGROUND ART

Conventionally, network systems that connect multiple points utilizing a ring network, a mesh network or the like, and that flexibly switch communication channels have been built, following advances in optical fiber communication systems. In such advanced networks, it is sought to process optical signals directly through multiple points, without converting the optical signals into electrical signals. Optical wavelength multi/demultiplexing circuits used here are required to have a broad and flat transmission band and low loss transmission characteristics.

Also, due to the rapid increase in traffic of data centers, mobile networks and the like in recent years, increasing the speed and capacity of optical trunk line networks that support these data centers and the like has become an even more essential technical matter. In addition to investigating ways to increase capacity through conversion of modulation schemes to multilevel formats, polarization division multiplexing and space division multiplexing, Dense Wavelength Division Multiplexing (hereinafter, DWDM) technology has also become a more important base technology than in the past.

Development for further increasing capacity through combining improved transmission speeds per wavelength with increased wavelength multiplexing numbers have hitherto been pursued on such a basis. In particular, to effectively utilize the limited bands of an optical amplifier, further reduction of the guard band between DWDM channels is desired. Minimization of the transition region width between the transmission wavelength region and the cutoff wavelength region is also sought at the same time as flattening of the transmission wavelength region in optical multi/demultiplexing circuits.

Furthermore, in recent years, delay reduction, power saving and the like have become strongly sought in network systems, and load reduction on DSPs (Digital Signal Processers) is required. It is thus sought to also suppress the nonlinearity of transmission phase characteristics such as wavelength dispersion inherent in optical multi/demultiplexing circuits to at least the processing capacity of DSPs.

A wavelength multi/demultiplexing circuit disclosed in PTL 1 such as shown in FIG. 1 is given as an example of a wavelength multi/demultiplexing circuit in which the transmission band is flat. This wavelength multi/demultiplexing circuit is constituted by using an AWG having cyclicity as a field modulation device 201, and connecting this field modulation device 201 and a multi-channel AWG 202 in series. The flat transmission band is realized by synchronizing the multi/demultiplexing characteristics of two AWGs.

Wavelength multi/demultiplexers that realize desired characteristics through synchronous coupling of a plurality of wavelength multi/demultiplexers in this way are called synchronized filters, and, in the case where one of the coupled wavelength multi/demultiplexers is an AWG in particular, are called synchronized AWGs. Since loss per AWG is constant, however, loss tends to increase in synchronized AWGs constituted by connecting two AWGs in series. Furthermore, when constituting a field modulation device requiring highly repetitive cyclicity with an AWG, the difficulty of achieving stable manufacturing is an issue. Given this situation, the current reality is that synchronized AWGs constituted by connecting AWGs in series are not that common.

A synchronized AWG disclosed in PTL 2 shown in FIG. 2 is given as another example of a wavelength multi/demultiplexing circuit that has low loss and excellent manufacturing stability, in comparison to the abovementioned wavelength multi/demultiplexing circuit. In this synchronized AWG, a Mach-Zehnder interferometer (hereinafter, MZI) 304 having a directional coupler 303 composed of two proximal waveguides is used as a field modulation device. That is, here, the MZI 304 having the directional coupler 303 is used as a field modulation device 301, instead of an AWG. A synchronized AWG is then constituted by connecting the output end of the directional coupler 303 to an AWG 302.

Since the MZI 304 has small excess loss and also has manufacturing stability even when provided with high cyclicity, the synchronized AWG disclosed in PTL 2 (particularly FIGS. 6 and 7 in PTL 2) is widely used as a wavelength multi/demultiplexing circuit with a flat transmission band.

Furthermore, a synchronized AWG disclosed in PTL 3 shown in FIG. 3 is given as an example of a wavelength multi/demultiplexing circuit that realizes a broad, flat transmission band. In this synchronized AWG, a lattice filter 404 having a directional coupler 403 is used as a field modulation device 401. A synchronized AWG is then constituted by coupling the directional coupler 403 of the lattice filter 404 to an AWG 402.

Further, a synchronized AWG disclosed in PTL 4 shown in FIG. 4 is given as an example of a wavelength multi/demultiplexing circuit having similar functions. In this synchronized AWG, an interference circuit 504 having three delay lines and a directional coupler 503 with three proximal waveguides is used as a field modulation device 501. A synchronized AWG is then constituted by coupling the directional coupler 503 to a downstream AWG 502.

Additionally, in a synchronized AWG according to NPL 1 shown in FIG. 5, an MZI 604 cascaded in a two-layer tree configuration having four waveguides 603 proximal to each other is used as a field modulation device 601. The synchronized AWG is constituted by coupling the four proximal waveguides 603 to a downstream AWG 602.

These synchronized AWGs all use a plurality of proximal waveguides in the connection between the field modulation device and the downstream AWG.

Incidentally, there is a tendency for the field of light that propagates through these plurality of waveguides that are proximal with a finite gap therebetween and run parallel to each other to be distributed toward the center of each waveguide, and thus the electric field intensity tends to decrease in the gap between waveguides. As a result, a shortcoming of synchronized AWGs of a type that use waveguides running parallel to each other for the connecting portion with the downstream AWG is that broadening the transmission band will lead to issues such as increased variation (ripple) of transmission loss and increased loss variation in the transmission band. Synchronized AWGs having such a configuration will be referred to below as parallel waveguide connection-type synchronized AWGs.

Hereinafter, the increase in transmission loss and loss variation in the transmission band in parallel waveguide connection-type synchronized AWGs will be described using calculation results.

FIG. 6 is a diagram representing, with regard to the connecting part in a parallel waveguide connection-type synchronized AWG, the results of calculating the distribution of the cross-sectional refractive index of waveguides running parallel with a gap therebetween and the distributions of electric field amplitudes in supermodes of different orders. Note that, in these calculations, in terms of the specific configuration of the connecting part, a structure in which three buried waveguides having a refractive index difference (A) of 1.5%, a waveguide width of 4.5 µm and a waveguide height of 4.5 µm run parallel with a 1 µm gap therebetween was assumed.

Referring to FIG. 6, it is evident that the electric field amplitude in each order of the supermodes has a field shape that has unevenness in comparison to the case of smooth cosine and sine curves.

FIG. 7 is a diagram showing the refractive index distribution of the parallel waveguide units shown in FIG. 6 and the distributions of electric field amplitudes that can be combined in three propagation modes starting from the low order supermodes. The combination examples 1 to 5 are the calculation results of simulation that optimized the intensity and amplitude of the three propagation modes, such that the center position of the field shape shifts from left to right, assuming that the field modulation device is operating synchronously.

Referring to FIG. 7, the combined field shape departs greatly from a Gaussian function curve, when the center position of the field shape is the vicinity of the gap between proximal waveguides. On the other hand, the field shape of the output waveguide connected to the second slab waveguide of the downstream AWG is close to a normal Gaussian function curve, in the signal wavelength band used in multi/demultiplexing, and, moreover, hardly changes in shape relative to changes in wavelength.

Considering this point, in a parallel waveguide connection-type synchronized AWG in which the combined field shape departs from a Gaussian distribution by a large degree, the problem of increased transmission loss occurs, and the problem of increased loss variation occurs in the case where the degree of departure from a Gaussian distribution varies.

In view of this, a technique for reducing the amount of loss variation by reducing the waveguide width of the parallel waveguides in order to compensate for such shortcomings is disclosed in PTL 5. However, with this method, there is a problem in that the transition region width between the transmission region and the cutoff region also increases, resulting in an increase in the wavelength region that cannot be used for transmission. Additionally, as disclosed in NPL 2, with parallel waveguides, there is also the problem of wavelength dispersion occurring due to supermodes being generated for waveguide coupling.

There is also a method of further broadening the transmission band while at the same time suppressing loss variation in the transmission band that inherently occurs in parallel waveguide connection-type synchronized AWGs and an increase in the transition region width between wavelength channels. A synchronized AWG having a configuration that uses a broad multimode waveguide without a finite waveguide gap for the connecting portion with a downstream AWG is given as an example of this method. Hereinafter, this configuration will be referred to as a multimode waveguide connection-type synchronized AWG.

Multimodes can be excited and propagated when a broad multimode waveguide without a finite waveguide gap has at least a certain waveguide width. Unlike the field shape of supermodes excited in the aforementioned parallel waveguides, the field shape of these multimodes can be substantially approximated by a trigonometric function, except for near both ends of the multimode waveguide. Thus, if the intensity and phase of each traverse mode can be appropriately controlled, it would be possible to freely form the field shape in the multimode waveguide.

FIG. 8 is a diagram representing, with regard to the connecting part in a multimode waveguide connection-type synchronized AWG, the results of calculating the distribution of the transverse cross-sectional refractive index of a multimode waveguide and the field shape (electric field amplitude) of multimodes of different orders. Note that, in the derivations in FIG. 8, simulation calculations were carried out assuming the structure of a buried multimode waveguide having a refractive index difference (A) of 1.5%, a waveguide width of 15.5 µm and a waveguide height of 4.5 µm.

Referring to FIG. 8, it is evident that the electric field amplitude in each order of the multimodes has a field shape that has little unevenness in comparison to the field shapes of the supermodes shown in FIG. 6, and is close to the case of cosine and sine curves, except for the near the ends of the waveguide.

FIG. 9 is a diagram showing the distributions of electric field amplitudes that can be combined in three propagation modes starting from the low order multimodes shown in FIG. 8. Here, the combination examples 1 to 5 are similarly the calculation results of simulation that optimized the intensity and amplitude of the three propagation modes, such that the center position of the field shape shifts from left to right, assuming that the field modulation device is operating synchronously.

Referring to FIG. 9, it is evident that each of the field shapes is close to a Gaussian function curve, compared to the results in the case of FIG. 7, and that the change in field shape is also small compared to the case of FIG. 7, and the half-width at half-maximum decreases in the combination examples 1 and 5 in which the center position of the field approaches either end of the multimode waveguide. Accordingly, if a field modulation device having a multimode waveguide at the output end is used, loss increase and loss variation due to mode mismatching can be suppressed to a low level throughout, excluding the case where the center position of the output field shape approaches either end of the multimode waveguide, that is, excluding both ends of the synchronous wavelength band.

These technologies have already been researched and developed in a scope which will be described below (e.g., PTLs 6 to 8).

FIG. 10 is a schematic view of an example of a synchronized AWG that uses a multimode waveguide 1103 for the connecting portion between a field modulation device 1101 and a downstream AWG 1102. This synchronized AWG is disclosed in PTL 6. One set of two optical delay lines having different lengths and a mode converter/multiplexer 1106 that generates and multiplexes zero-order and first-order traverse modes are used for the field modulation device 1101 of this synchronized AWG.

The mode converter/multiplexer 1106 has two waveguide ports for fundamental mode input and one multimode waveguide 1103 for output. The two fundamental mode input waveguide ports are a first fundamental mode input waveguide port 1104 and a second fundamental mode input waveguide port 1105. The mode converter/multiplexer 1106 has a function of converting signal light input to the ports into specific traverse modes and multiplexing the resultant traverse modes. Here, the signal light input to the first fundamental mode input waveguide port 1104 is converted into a zero-order traverse mode of the output multimode waveguide 1103. Also, the signal light input to the second fundamental mode input waveguide port 1105 is converted into a first-order traverse mode of the output multimode waveguide 1103. An optical delay difference is provided by forming the waveguide connected to the first fundamental mode input waveguide port 1104 into a bent shape.

FIG. 11 is a schematic view of another example of a synchronized AWG that uses a multimode waveguide 1203 for the connecting portion between a field modulation device 1201 and a downstream AWG 1202. This synchronized AWG is disclosed in PTL 7. Here, instead of an MZI having one set of a set of two optical delay lines having different lengths being used as the field modulation device 1101 disclosed in PTL 6, it is devised to use the lattice filter 404 having 2 sets of a set of optical delay lines having different lengths as the field modulation device 1201. The lattice filter 404 composed of 2 sets of two optical delay lines having different lengths and a mode converter/multiplexer 1206 that generates and multiplexes zero-order and first-order traverse modes are used for this field modulation device 1201.

The mode converter/multiplexer 1206 has two waveguide ports for fundamental mode input and one multimode waveguide 1203 for output. The two fundamental mode input waveguide ports are a first fundamental mode input waveguide port 1204 and a second fundamental mode input waveguide port 1205. The mode converter/multiplexer 1206 has a function of converting signal light input to the ports into specific traverse modes and multiplexing the resultant traverse modes. Here, an optical delay difference is provided by forming at least one of the waveguide connected to the first fundamental mode input waveguide port 1204 and the waveguide connected to the second fundamental mode input waveguide port 1205 into a bent shape. Here, by optimizing the optical delay difference of the two sets of optical delay lines, light wavelength dependence that differs from PTL 6 is provided to the intensity and phase of signals input to the mode converter/multiplexer 1206, and improvement in the optical multiplexing characteristics is achieved.

With the synchronized AWG of PTL 7, a detailed spectrum after improvement is disclosed, and similar results are also reported in NPL 3. The detailed spectrum after improvement shows transmission region flatness with transmission region loss variation of not more than 0.4 dB and a 1 dB bandwidth of not less than 74 GHz in a synchronized AWG with 100 GHz channel spacing. Also, a high rectangular transmission loss spectrum with a 3 dB to 20 dB cutoff region width as narrow as 35 GHz is realized.

However, there is a problem in that the phase spectrum of the synchronized AWG disclosed in NPL 3 cannot be flattened with a synchronized AWG alone, resulting in group delay variation of approximately 5 ps.

FIG. 12 is a schematic view of another example of a synchronized AWG that uses a multimode waveguide 1303 for the connecting portion between a field modulation device 1301 and a downstream AWG 1302. This synchronized AWG is disclosed in PTL 8. Here, the field modulation device 1301 that joins to the downstream AWG 1302 is devised. The configuration of the field modulation device 1301 of this synchronized AWG is very similar to the synchronized AWG that is disclosed in PTL 6, but differs from the synchronized AWG of described in PTL 6 in that the traverse modes generated and multiplexed by a mode converter/multiplexer 1306 are zero-order and second-order traverse modes.

The mode converter/multiplexer 1306 has two waveguide ports for fundamental mode input and one multimode waveguide 1303. Two fundamental mode input waveguide ports are a first fundamental mode input waveguide port 1304 and a second fundamental mode input waveguide port 1305. The mode converter/multiplexer 1306 has a function of converting signal light input to the ports into specific traverse modes and multiplexing the resultant traverse modes. Here, an optical delay difference is provided by forming at least one of the waveguide connected to the first fundamental mode input waveguide port 1304 and the waveguide connected to the second fundamental mode input waveguide port 1305 into a bent shape. The mode converter/multiplexer 1306 described here aims to improve the optical multiplexing characteristics, by exciting traverse modes of different orders to PTL 6 in the intensity and phase of two inputs.

However, although an improvement difference over a Gaussian AWG that is not synchronized is shown in the above PTL 8, a marked difference is not observed in comparison to the synchronized AWG disclosed in PTL 2 or the synchronized AWG (higher order modes of two orders) disclosed in PTL 6.

FIG. 13 is a schematic view of yet another example of a synchronized AWG that uses an MMI-Phaser 1404 and a multimode waveguide unit 1403 serving as a field modulation device 1401 for the connecting portion with a downstream AWG 1402. This synchronized AWG is disclosed in PTL 9, and is an MMI (Multimode Interferometer).

In this synchronized AWG, the field modulation device 1401 is constituted by connecting the multimode waveguide unit 1403 to the MMI-Phaser 1404, but there is no description of the wavelength spectral shape of the implementation result. Generally, when signal light enters the multimode waveguide unit 1403 of the MMI, traverse modes of at least the number of entry ports are excited in the multimode waveguide unit 1403. In the case where higher order modes of this excessive number of traverse modes excited on the entrance side of the multimode waveguide unit 1403 propagates to the exit side, phase variation and loss variation in the transmission band occur.

In view of this, as a method of suppressing this variation, a technique that involves higher order modes being cut off by narrowing the waveguide width of the multimode waveguide unit 1403 and dispersed into cladding modes is conceivable. However, there is a high possibility that components that should have been dispersed will become evanescent waves and enter the downstream AWG 1402 almost without loss. In such a case, a problem arises in that phase variation and loss variation in the transmission band occur, and, furthermore, crosstalk variation occurs even in the cutoff region.

As described above, following demands for increased transmission capacity, an optical multiplexing circuit is required to simultaneously achieve broadening of the transmission bandwidth, reduction of the transition region between wavelength channels and flattening of the phase spectrum, in addition to low loss in the transmission wavelength band and a flat loss spectrum. However, in order to broaden the transmission region bandwidth further with existing synchronized AWGs, there are various restrictions and problems such as will be described below depending on the type of synchronized AWG.

That is, with a technique that also uses an AWG for the field modulation device, there is the problem of increased loss. Also, with a configuration that increases the number of parallel waveguides of the connecting part between the field modulation device and the downstream AWG, there is the problem of it being difficult to further suppress both the amount of loss variation in the transmission region and the width of the cutoff region between wavelength channels. Additionally, there is also the problem of wavelength dispersion occurring due to supermodes resulting from mode coupling between waveguides of a parallel waveguide unit.

There are also problems with a configuration in which a multimode waveguide is used for the connecting part between the field modulation device and the downstream AWG, and input signal light is branched and then guided to two input ports of the mode converter/multiplexer after providing a predetermined delay difference. In this case, there is the problem of large wavelength dispersion occurring when further broadening the transmission bandwidth. Furthermore, with a synchronous AWG that uses an MMI-Phaser as the field modulation device, there is concern about the occurrence of phase variation and loss variation in the transmission band.

CITATION LIST

Patent Literature

[PTL 1] JP 2000-515993T
[PTL 2] JP 3256418
[PTL 3] JP 5462270
[PTL 4] JP 5106405
[PTL 5] JP 3931834
[PTL 6] JP 4100489
[PTL 7] JP 5180322
[PTL 8] U.S. Pat. No. 8,295,661B2
[PTL 9] U.S. Pat. No. 6,587,615B1

Non Patent Literature

[NPL 1] K. Maru, T. Mizumoto, and H. Uetsuka, "Demonstration of flat-passband multi/demultiplexer using multi-input arrayed waveguide grating combined with cascaded Mach-Zehnder interferometers", J. Lightwave Technol. VOL. 25, NO. 8, August 2007
[NPL 2] E. Kapon, J. Katz, and A. Yariv, "Supermode analysis of phase-locked arrays of semiconductor lasers", Opt. Lett. Vol. 10, No. 4, 125-127 (1984).
[NPL 3] M. Oguma, T. Kitoh, A. Mori, and H. Takahashi, "Ultrawide-Passband Tandem MZI-Synchronized AWG and Group Delay Ripple Balancing Out Technique", European Conf. Optical Communication (ECOC), 2010, Paper We.8.E.2.

SUMMARY OF THE INVENTION

Fundamental aspects (first aspect and second aspect) of the present invention have been conceived to solve such problems. An object thereof is to provide a synchronized AWG-type optical wavelength multi/demultiplexing circuit with a high rectangular transmission loss spectrum that is able to secure loss flatness of the transmission band, maintain/reduce the guard bandwidth of wavelength channel spacing, and broaden the transmission bandwidth.

While it is favorable to introduce further innovation to multimode waveguide connection-type synchronized AWGs that have excellent loss ripple characteristics, in order to provide synchronized AWGs with low loss and flat transmission characteristics exceeding the conventional examples described above, there are no design guidelines for the case where more than two modes that are excited. In view of this, the inventor and others involved with the present invention accomplished the invention by working to improve the overall characteristics of the above synchronous AWGs conversely from the viewpoint of what characteristics the field modulation device needs to exhibit.

As description of a summary of the invention, first, the optical frequency response of a field modulator needed to obtain a high rectangular light output waveform with low loss in a synchronized AWG will be described. This will show the ideal optical frequency response of higher order modes that are excited in the multimode waveguide of a field modulator, and will include description of specific shape characteristics. This will be following by a discussion of what the optical frequency response of signal light to be guided to respective input ports of a mode convertor/multiplexer corresponding to the higher order modes should be. How the field modulator should be structured in order to obtain the optical frequency response of signal light to be guided to respective input ports will then be described in due course, and, finally, a favorable circuit configuration for obtaining the desired characteristics will be discussed.

The fact that loss in a synchronous AWG as a whole is low and flat near a center wavelength λc of each wavelength channel is noted. This is equivalent to the electric field amplitude that forms an image on the interface between the second slab waveguide of the downstream AWG and the individual channel output waveguides having a similar shape to the fundamental mode of the output waveguide, and the center position of the electric field amplitude staying near λc. That is, this is also equivalent to the center position of the incident electric field on the first slab waveguide of the downstream AWG moving along the X-coordinate orthogonal to the optical axis direction near λc according to the wavelength demultiplexing characteristics and the signal wavelength of the downstream AWG, and the incident electric field having a similar shape to the fundamental mode of the output waveguide. Accordingly, the ideal optical frequency response of higher order modes that are excited in the above multimode waveguide are convolutions of the respective field shapes of the fundamental mode of the above output waveguide and the higher order modes of the above multimode waveguide. Note that, here, the fact that the amount of movement of the center position of the incident electric field which moves according to the wavelength demultiplexing characteristics and the signal wavelength downstream AWG is in a linear relation with the amount of change of the signal wavelength, and the fact that the X-coordinate difference which is a convolution variable is replaceable by the amount of change of the signal light wavelength are utilized.

Procedures and results of numerical calculation performed in accordance with actual waveguide specifications with regard to the specific shape of the ideal optical frequency response of each higher order mode will be described using FIGS. 14 to 16.

FIG. 14 is a schematic diagram showing the result of calculating the refractive index distribution related to one specification of the multimode waveguide coupling the field modulation device and the downstream AWG of an optical wavelength multi/demultiplexing circuit and the electric field amplitude distribution of propagation modes of different orders. Note that, in FIG. 14, apart from the horizontal axis being X-coordinates orthogonal to the optical axis and the vertical axis being the refractive index and the electric field amplitude at respective coordinates, as one specification of the multimode waveguide, the relative refractive index difference Δ is 0.75%, the waveguide width is 20 µms and the waveguide height is 6.5 µms.

FIG. 15 is a schematic diagram showing the result calculating the refractive index distribution of individual channel output waveguides that are connected to the downstream AWG of an optical wavelength multi/demultiplexing circuit and the electric field amplitude distribution of a zero-order propagation mode. Note that, in FIG. 15, apart from the horizontal axis being X-coordinates orthogonal to the optical axis and the vertical axis being the refractive index and the electric field amplitude at respective coordinates, as one specification of the multimode waveguide, the relative refractive index difference Δ is 0.75%, the waveguide width is 10 µms and the waveguide height is 6.5 µms. Here, the relative refractive index difference Δ and the waveguide height are identical to the calculation conditions in FIG. 14.

FIG. 16 is a schematic diagram showing the result calculating the convolution with the zero-order mode (fundamental mode) shown in FIG. 15 for each mode in FIG. 14. As mentioned above, FIG. 16 corresponds to the ideal solution for the optical frequency response of the higher order modes that is required for loss in the synchronous AWG as a whole to be low and the transmission region to be flat. Note that the electric field amplitudes were convoluted, and thus the vertical axis of FIG. 16 is also the electric field amplitude.

According to FIG. 16, the ideal optical frequency response of the electric field amplitude is characterized by the absolute value of odd-order response functions being a minimum and the absolute value of even-order response functions being a maximum at an X-axis coordinate difference of zero, that is, at the center wavelength λc. Furthermore, it is evident that the optical frequency response is characterized by the sum of the number of peaks and valleys thereof increasing every time the order of the mode increases, regardless of the order being odd or even. Looking closer, it is evident that the number of peaks and valleys respectively increase by one every time the order increases by two. Furthermore, the frequency response reverse sign across the point at which the absolute value of all the response functions is zero.

Here, in the case of using a mode convertor/multiplexer in which the ratio of the electric field amplitude of signal light that is guided to respective input ports of the mode convertor/multiplexer and the electric field amplitude of respective higher order modes that are excited in the multimode waveguide that serves as an output is constant, the ideal optical frequency responses of signal light to be guided to respective input ports of the mode convertor/multiplexer will also be identical to the respective optical frequency responses shown in FIG. 16.

That is, a synchronized AWG with low loss and a flat transmission region can be realized, if an optical circuit that provides the characteristics of the ideal optical frequency response shown in FIG. 16 to the electric field amplitude of signal light that is guided to respective input ports of the mode convertor/multiplexer can be provided upstream of the mode convertor/multiplexer.

Here, the general characteristics of a two-beam interferometer known as an asymmetric Mach-Zehnder interferometer will be discussed. An asymmetric Mach-Zehnder interferometer is low loss and capable of readily realizing provision of high repetition frequency characteristics, and, furthermore, an asymmetric Mach-Zehnder interferometer is, in the case of being designed to adjust the light intensity minimum point of one of the two outputs to the center wavelength λc, characterized by the light intensity maximum point of the output on the opposite side being the center wavelength λc. Also, the output electric field amplitude of an asymmetric Mach-Zehnder interferometer is characterized by the electric field amplitude reversing sign at the minimum point of the light intensity (i.e., at the minimum point of the absolute value of the electric field amplitude). Also, if a plurality of asymmetric Mach-Zehnder interferometers are provided, and are designed such that the repetition period is a ratio of natural numbers, the frequency response according to which the number of peaks and valleys respectively increase by one every time the order increases by two, among the specific characteristics of the response function taken to be ideal, is also realizable.

Note that, generally, an asymmetric Mach-Zehnder interferometer is constituted by a one-input two-output or two-input two-output branching circuit, two optical delay lines having different optical path length differences, and a two-input two-output or two-input one-output multiplexing/branching circuit. However, the above characteristics of the optical frequency response are also realizable with an asymmetric two-beam interferometer in which the branching circuit is not one-input two-output or two-input two-output. Accordingly, the optical circuit to be provided upstream of the mode convertor/multiplexer of the multimode waveguide connection-type synchronized AWG is realizable by being constituted by an asymmetric two-beam interferometer such as described above. The internal configuration of the optical circuit differs, however, depending on whether the number of optical delay lines in the above optical circuit is even or odd, and thus two cases will be presented in the following detailed discussion of favorable circuit configurations for obtaining desired characteristics.

An optical circuit configuration favorable in achieving the above object and having an even number of optical delay lines will be discussed.

A first aspect of the present invention is an optical wavelength multi/demultiplexing circuit including an AWG and a field modulation device optically connected to the AWG, and using a multimode waveguide for a connecting part between the AWG and the field modulation device, the AWG including an arrayed waveguide composed of a plurality of channel waveguides; and a slab waveguide connected to the arrayed waveguide, the field modulation device including a common input waveguide; 2N optical delay lines (N being a positive integer greater than or equal to 2) having mutually different optical delay lengths; an optical branching unit configured to distribute signal light output from the common input waveguide to the 2N optical delay lines; a multiplex interference unit configured to perform multiplex interference of the 2N beams of signal light output from the optical delay lines and output 2N or 2N−1 beams of the signal light; and a mode converter/multiplexer configured to convert and multiplex the 2N or 2N−1 beams of signal light output from the multiplex interference unit in mutually different waveguide traverse modes, and output the multiplexed signal light to the slab waveguide via the multimode waveguide, the 2N optical delay lines satisfying a relation $L_i=(i-1)\times \Delta L+L_1+\alpha_i$ (i>1), where ΔL is a predetermined optical delay length difference, $L_i$ is an optical delay length of an ith optical delay line in ascending order of the optical delay length, and $\alpha_i$ is a phase adjustment length of the ith optical delay line, the $\alpha_i$ satisfying a relation $-10\times(\lambda/n_e)<\alpha_i<10\times(\lambda/n_e)$, where λ is a wavelength of the signal light, and $n_e$ is an effective refractive index of the optical delay line, and an optical frequency repetition period of the field modulation device determined by the ΔL being consistent with an integer multiple of a channel spacing of the AWG, the multiplex interference unit including N two-input two-output multiplex interference elements or N−1 two-input two-output multiplex interference elements and one two-input one-output multiplex interference element, signal light output from an N+1−jth line (j being a positive integer from 1 to N inclusive) of the optical delay lines in ascending order of the optical delay length and signal light output from an N+jth line of the optical delay lines in ascending order of the optical delay length, out of the 2N beams of signal light output from the optical delay lines, being guided to inputs of the two-input two-output multiplex interference elements, and $\alpha_{N+1-j}$ and $\alpha_{N+j}$ being set such that one of the two outputs of the two-input two-output multiplex interference elements is an intensity maximum at a center wavelength λc of the optical frequency repetition period of the field modulation device, and if j<N, output that is the intensity maximum at the λc being guided to an input port for converting to a 2j−2th order traverse mode, out of input ports of the mode converter/multiplexer, and other output is guided to an input port of the mode converter/multiplexer for converting to a 2j−1th order traverse mode, and if j=N, output that is the intensity maximum at the λc being guided to an input port for converting to a 2N−2th order traverse mode out of the input ports of the mode converter/multiplexer.

Also, an optical circuit configuration favorable in achieving the above object and having an odd number of optical delay lines will be discussed.

A first aspect of the present invention is an optical wavelength multi/demultiplexing circuit including an AWG and a field modulation device optically connected to the AWG, and using a multimode waveguide for a connecting part between the AWG and the field modulation device, the AWG including an arrayed waveguide composed of a plurality of channel waveguides; and a slab waveguide connected to the arrayed waveguide, the field modulation device including a common input waveguide; 2N+1 optical delay lines (N being a positive integer greater than or equal to 2) having mutually different optical delay lengths; an optical branching unit configured to distribute signal light output from the common input waveguide to the 2N+1 optical delay lines; a multiplex interference unit configured to perform multiplex interference of the 2N+1 beams of signal light output from the optical delay lines and output 2N+1 or 2N beams of the signal light; and a mode converter/multiplexer configured to convert and multiplex the 2N+1 or 2N beams of signal light output from the multiplex interference unit in mutually different waveguide traverse modes, and output the multiplexed signal light to the slab waveguide via the multimode waveguide, the 2N+1 optical delay lines satisfying a relation $L_i=(i-1)\times\Delta L+L_1+\alpha_i$ (i>1), where ΔL is a predetermined optical delay length difference, $L_i$ is an optical delay length of an ith optical delay line in ascending order of the optical delay length, and $\alpha_i$ is a phase adjustment length of the ith optical delay line, the $\alpha_i$ satisfying a relation $-10\times(\lambda/n_e)<\alpha_i<10\times(\lambda/n_e)$, where λ is a wavelength of the signal light, and $n_e$ is an effective refractive index of the optical delay line, and an optical frequency repetition period of the field modulation device determined by the ΔL being consistent with an integer multiple of a channel spacing of the AWG, the multiplex interference unit including N two-input two-output multiplex interference elements or N−1 two-input two-output multiplex interference elements and one two-input one-output multiplex interference element, signal light output from an N+1−jth line (j being a positive integer from 1 to N inclusive) of the optical delay lines in ascending order of the optical delay length and signal light output from an N+1+jth line of the optical delay lines in ascending order of the optical delay length, out of the 2N beams of signal light output from the optical delay lines, being guided to inputs of the two-input two-output multiplex interference elements, and $\alpha_{N+1-j}$ and $\alpha_{N+1+j}$ being set such that one of the two outputs of the two-input two-output multiplex interference elements is an intensity minimum at a center wavelength λc of the optical frequency repetition period of the field modulation device, and if j<N, output that is the intensity minimum at the λc being guided to an input port for converting to a 2j−1th order traverse mode out of input ports of the mode converter/multiplexer, and other output is guided to an input port of the mode converter/multiplexer for converting to a 2jth order traverse mode, if j=N, output that is the intensity minimum at the λc being guided to an input port for converting to a 2j−1th order traverse mode out of the input ports of the mode converter/multiplexer, and if j=0, signal light output from an N+1th line of the optical delay lines in ascending order of the optical delay length being guided to an input port for converting to a zero-order traverse mode out of the input ports of the mode converter/multiplexer.

Furthermore, the following third aspect was conceived in order to provide a synchronized AWG-type optical wavelength multi/demultiplexing circuit having a transmission spectrum that also has phase flatness, in addition to the loss flatness of the transmission band realizable in the first aspect or second aspect described above.

As for a specific configuration, in addition to the configuration adopted in the abovementioned first aspect or second aspect, all merging ratios of the multiplex interference elements included in the multiplex interference unit are 50:50, and an intensity of light distributed by the optical branching unit to two of the optical delay lines configured to output signal light that is to undergo multiplex interference is an equal distribution ratio.

Hereinafter, the basis for the related operation and effect will be described. A transfer function T of a two-beam interferometer composed of an optical branching unit, two optical delay lines and a multiplex interference element is represented as in the following Equation 1.

Math. 1

$$T = \begin{bmatrix} \cos\alpha, & -j\sin\alpha \\ -j\sin\alpha, & \cos\alpha \end{bmatrix} \begin{bmatrix} e^{-jk\frac{nL}{2}}, & 0 \\ 0, & e^{jk\frac{nL}{2}} \end{bmatrix} \begin{bmatrix} \cos\beta, & -j\sin\beta \\ -j\sin\beta, & \cos\beta \end{bmatrix} \begin{bmatrix} 1 \\ 0 \end{bmatrix} \quad (1)$$

Note that, in Equation 1, α is the coupling angle of the multiplex interference elements, β is the coupling angle of the optical branching units, n is the refractive index of two optical delay lines, L is the waveguide length difference of two optical delay lines, and k is the wavenumber represented by k=2π/λ and the signal wavelength λ.

The coupling angles α and β of a given value have respective relations $A=\{\sin(\alpha)\}^2$ and $B=\{\sin(\beta)\}^2$ to a merging ratio A of each multiplex interference element and a distribution ratio B of each optical branching unit.

Developing the calculation of the transfer function T in this Equation 1 results in the following Equation 2.

Math. 2

$$T = \begin{bmatrix} \cos(\alpha+\beta)\cos\left(k\frac{nL}{2}\right) - j\cos(\alpha-\beta)\sin\left(k\frac{nL}{2}\right) \\ -\sin(\alpha-\beta)\sin\left(k\frac{nL}{2}\right) - j\sin(\alpha+\beta)\cos\left(k\frac{nL}{2}\right) \end{bmatrix} \quad (2)$$

Here, when the coupling angles α and β have given values, the ratio of the real component of each element of the transfer matrix and the imaginary component varies nonlinearly depending on the value of the wavenumber k. The ratio of a real component and the imaginary component corresponds to the phase angle, and thus the phase angle varying depending on the wavenumber k means that the phase characteristics change, that is, group delay time variation or wavelength dispersion occurs.

However, with the configuration adopted in the third aspect, A=0.5 and hence α=0.25n, given that the intensity of light distributed by the optical branching unit to two optical delay lines is an equal distribution ratio. Also, in the third aspect, it is necessary for $\{\cos(\beta)\}2=\{-j\ \sin(\beta)\}2=0.5=0.25\pi$, given that the intensity of light distributed by the optical branching unit in the third aspect is an equal distribution ratio. As a result, the transfer function T of the two-beam interference system is represented as in the following Equation 3.

Math. 3

$$T = -j \begin{bmatrix} \sin\left(k\frac{nL}{2}\right) \\ \cos\left(k\frac{nL}{2}\right) \end{bmatrix} \quad (3)$$

The real component is not included in each element of the transfer matrix shown in Equation 3, only the imaginary component. Thus, the ratio of the real component and the imaginary component will be constant irrespective of the value of the wavenumber k. Because the ratio of the real component and the imaginary component corresponds to the phase angle, the phase characteristics do not change in the transfer matrix elements of Equation 3. Generally, the frequency dependence of the phase characteristics of the optical branching unit, the mode converter/multiplexer and the downstream AWG that are used in the multimode waveguide connection-type synchronized AWG is sufficiently small compared to that which degrades the transmission signal. Accordingly, with the configuration of the third aspect which includes a two-beam interference system having the transfer function of Equation 3, it becomes possible to provide a synchronized AWG-type optical wavelength multi/demultiplexing circuit having a transmission spectrum that also has phase flatness, in addition to loss flatness of the transmission band.

As described above, if the configuration of the first aspect or the second aspect of the present invention is adopted, it becomes possible to provide a synchronized AWG-type optical wavelength multi/demultiplexing circuit with a high rectangular transmission loss spectrum that is able to secure loss flatness of the transmission band, maintain/reduce the guard bandwidth of wavelength channel spacing and broaden the transmission bandwidth. Furthermore, if the configuration of the third aspect of the present invention is adopted, it becomes possible to provide a synchronized AWG-type optical wavelength multi/demultiplexing circuit with a high rectangular transmission loss spectrum that is able maintain/reduce the guard bandwidth of wavelength channel spacing and broaden the transmission bandwidth, having also secured phase flatness in addition to loss flatness of the transmission band.

DESCRIPTION OF EMBODIMENTS

Hereinafter, an optical wavelength multi/demultiplexing circuit of the present invention will be described in detail given a number of embodiments, with reference to the drawings.

Embodiment 1

Figure 1:
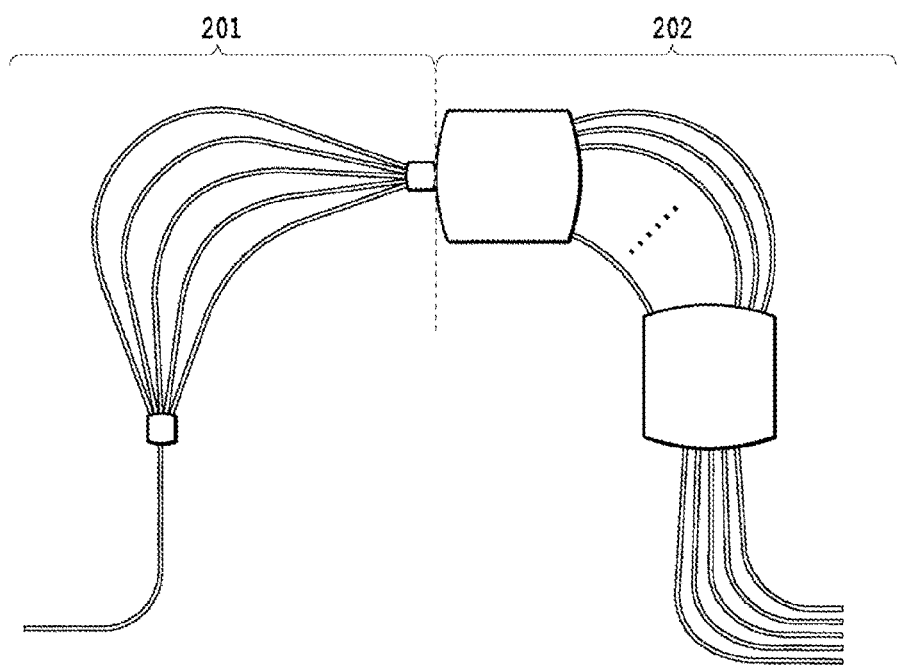
FIG. 1 is a schematic diagram of a wavelength multi/demultiplexing circuit disclosed in PTL 1.
Figure 2:
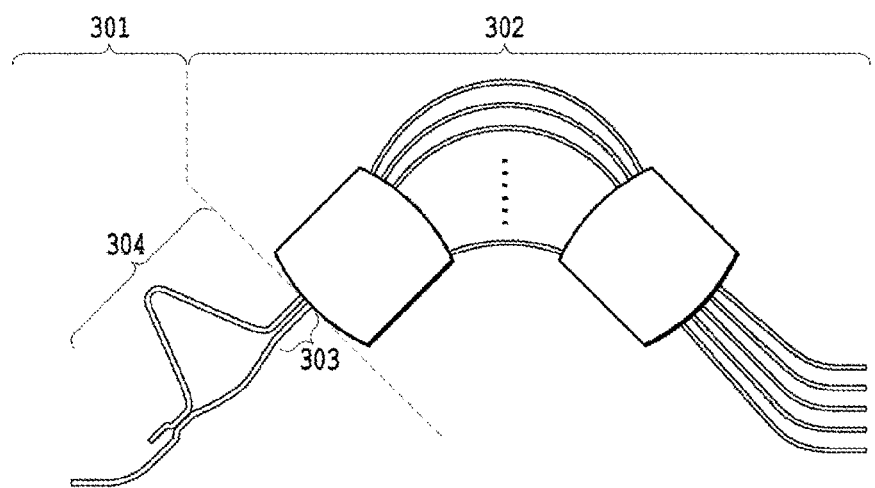
FIG. 2 is a schematic diagram of a wavelength multi/demultiplexing circuit disclosed in PTL 2.
Figure 3:
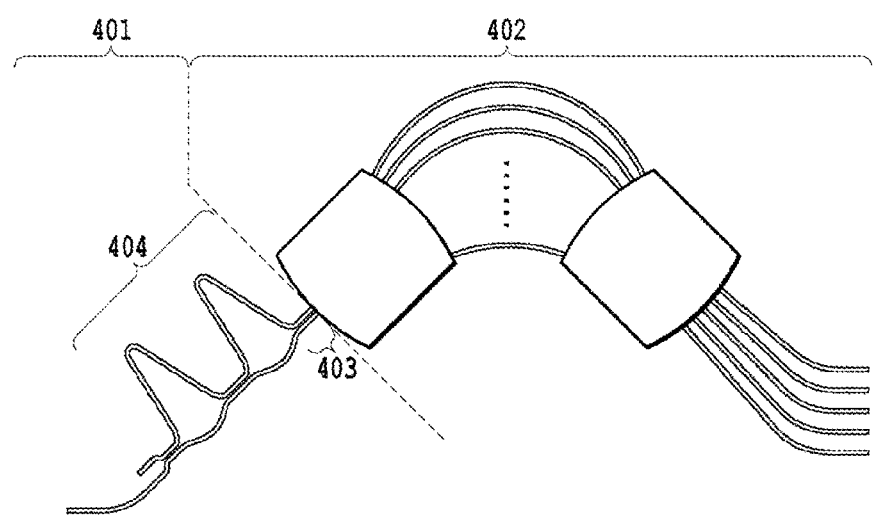
FIG. 3 is a schematic diagram of a wavelength multi/demultiplexing circuit disclosed in PTL 3.
Figure 4:
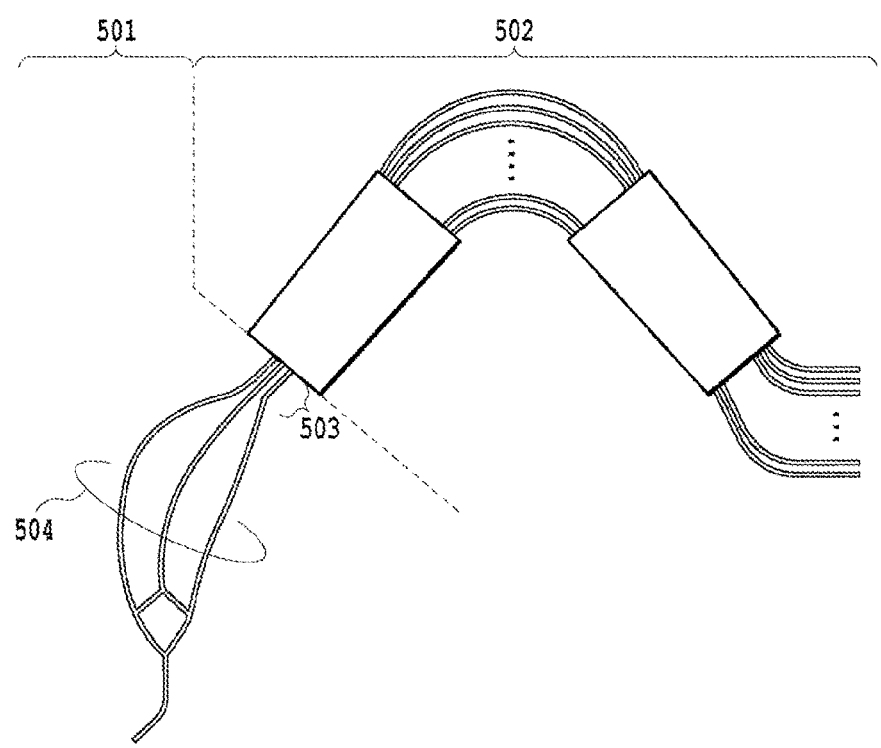
FIG. 4 is a schematic diagram of a wavelength multi/demultiplexing circuit disclosed in PTL 4.
Figure 5:
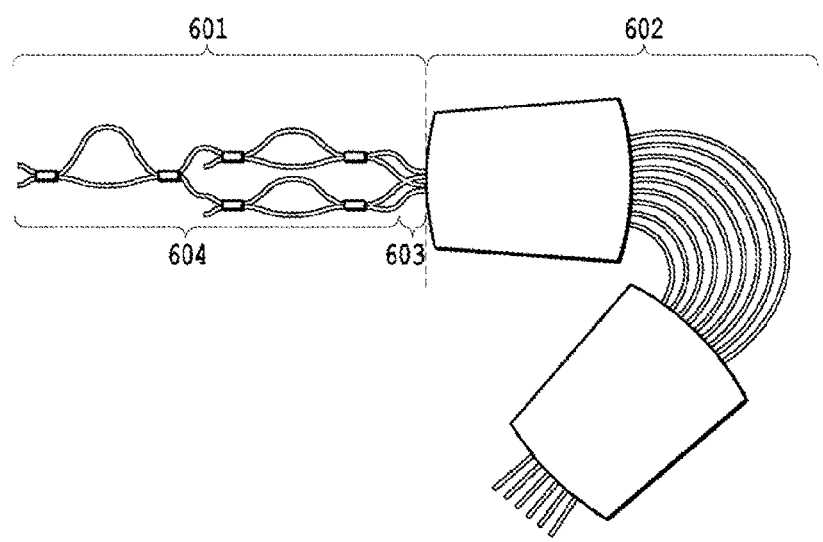
FIG. 5 is a schematic diagram of a wavelength multi/demultiplexing circuit disclosed in NPL 1.
Figure 6:
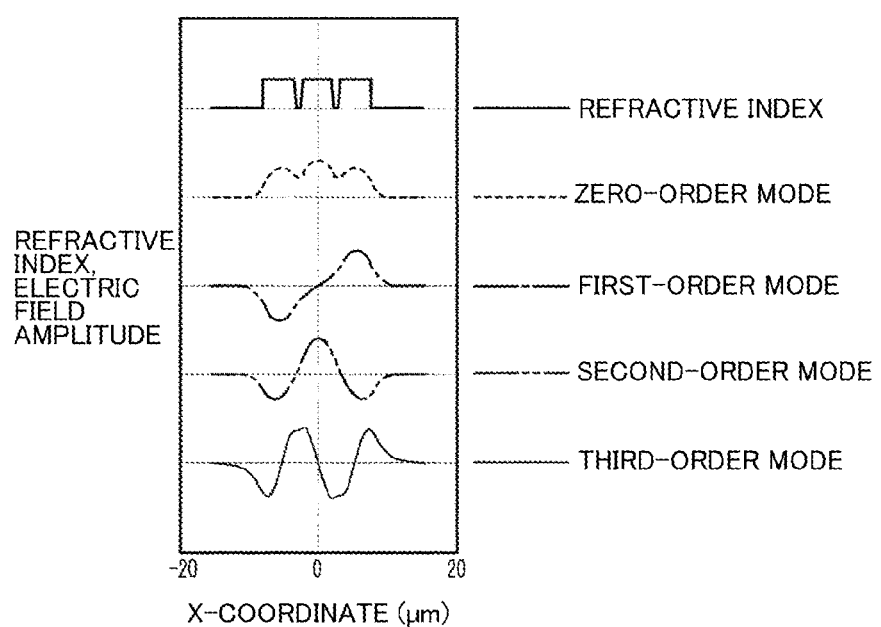
FIG. 6 is a diagram representing, with regard to the connecting part in a parallel waveguide connection-type synchronized AWG, the results of calculating the distribution of the cross-sectional refractive index of waveguides running parallel with a gap therebetween and the distributions of electric field amplitudes in supermodes of different orders.
Figure 7:
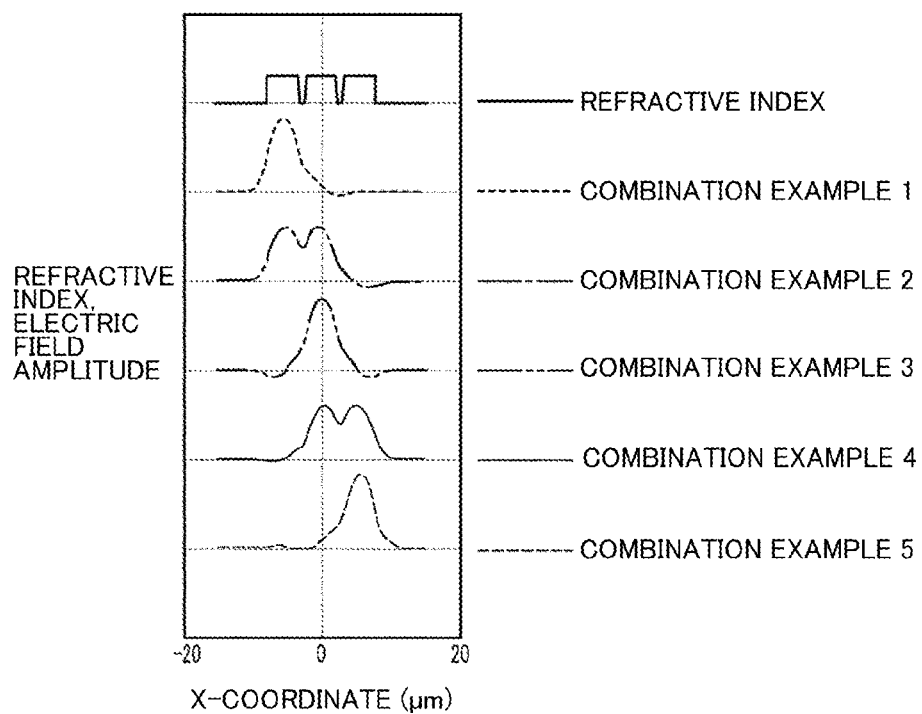
FIG. 7 is a diagram showing the refractive index distribution of parallel waveguide units shown in FIG. 6 and the distributions of electric field amplitudes that can be combined in three propagation modes starting from the low order supermodes.
Figure 8:
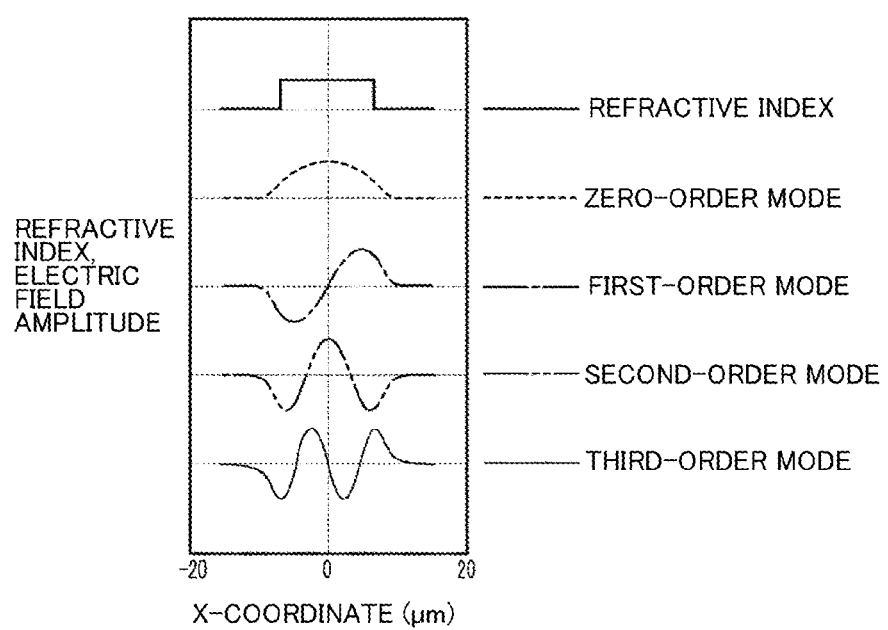
FIG. 8 is a diagram representing, with regard to the connecting part in a multimode waveguide connection-type synchronized AWG, the results of calculating the distribution of the transverse cross-sectional refractive index of a multimode waveguide and the field shape (electric field amplitude) of multimodes of different orders.
Figure 9:
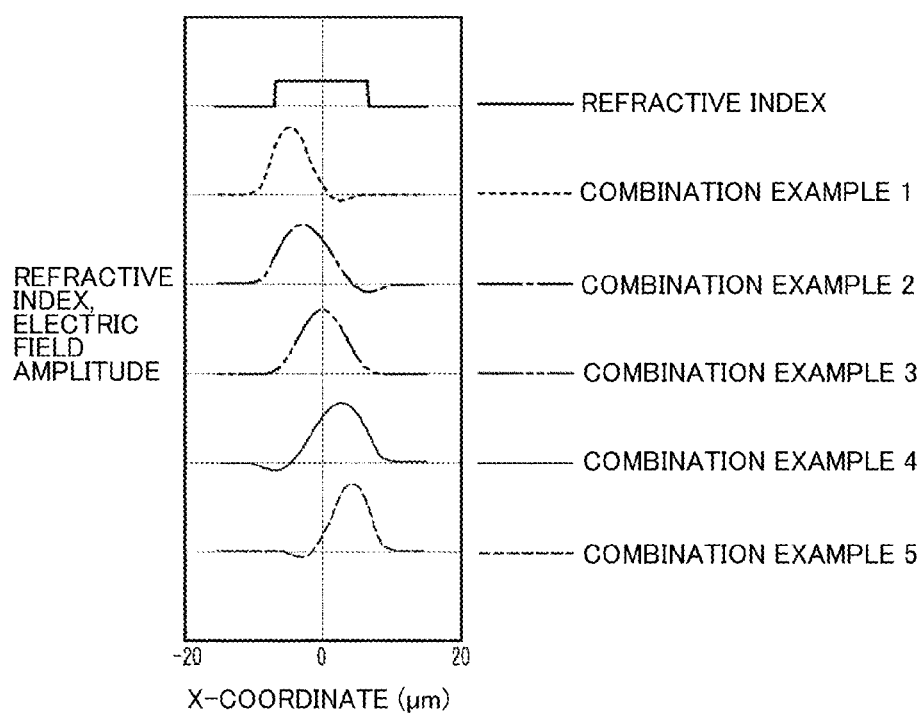
FIG. 9 is a diagram showing the distributions of electric field amplitudes that can be combined in three propagation modes starting from the low order multimodes shown in FIG. 8.
Figure 10:
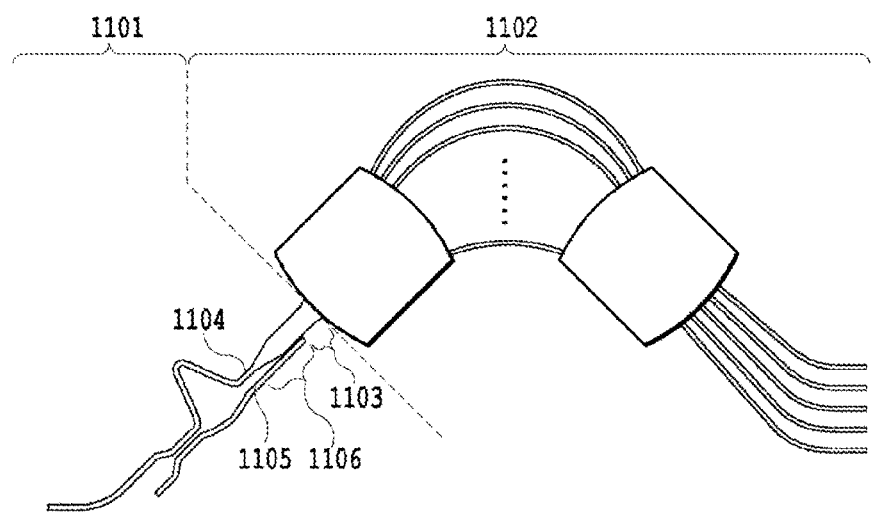
FIG. 10 is a schematic view of an example of a synchronized AWG, disclosed in PTL 6, that uses a multimode waveguide serving as a field modulation device for the connecting portion with a downstream AWG.
Figure 11:
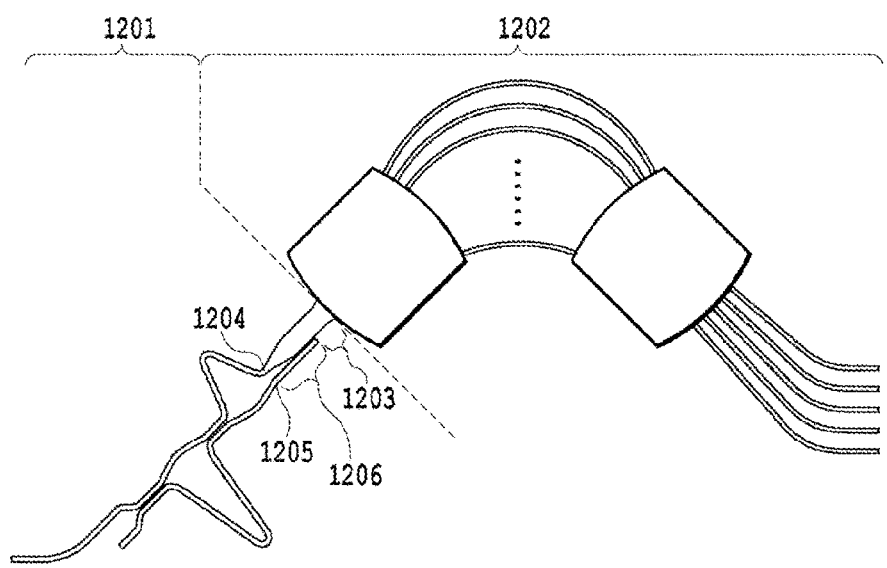
FIG. 11 is a schematic view of another example of a synchronized AWG, disclosed in PTL 7, that uses a multimode waveguide serving as a field modulation device for the connecting portion with a downstream AWG.
Figure 12:
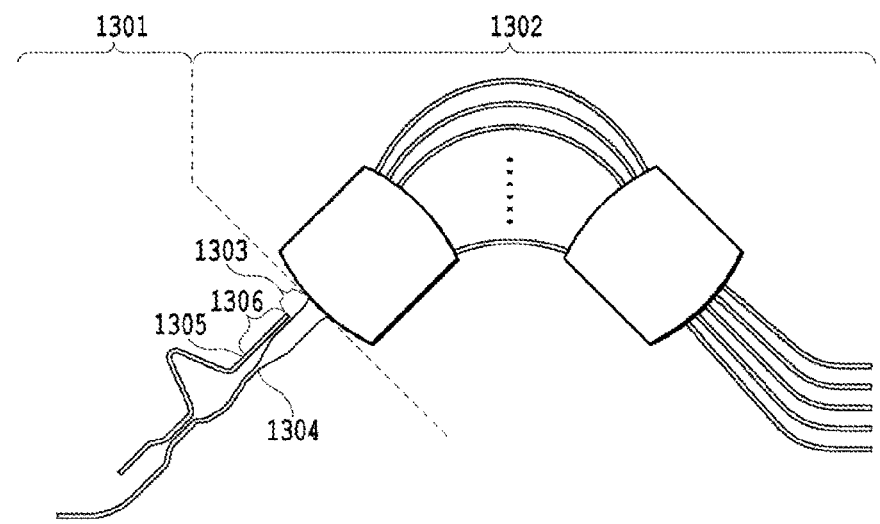
FIG. 12 is a schematic view of another example of a synchronized AWG, disclosed in PTL 8, that uses a multimode waveguide serving as a field modulation device for the connecting portion with a downstream AWG.
Figure 13:
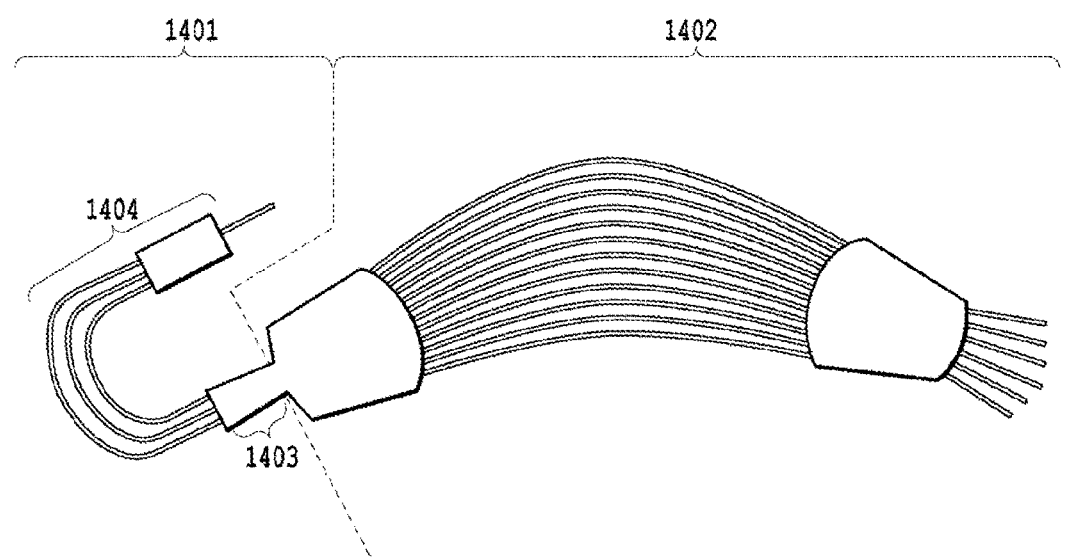
FIG. 13 is a schematic view of yet another example of a synchronized AWG, disclosed in PTL 9, that uses a multimode waveguide serving as a field modulation device for the connecting portion with a downstream AWG.
Figure 14:
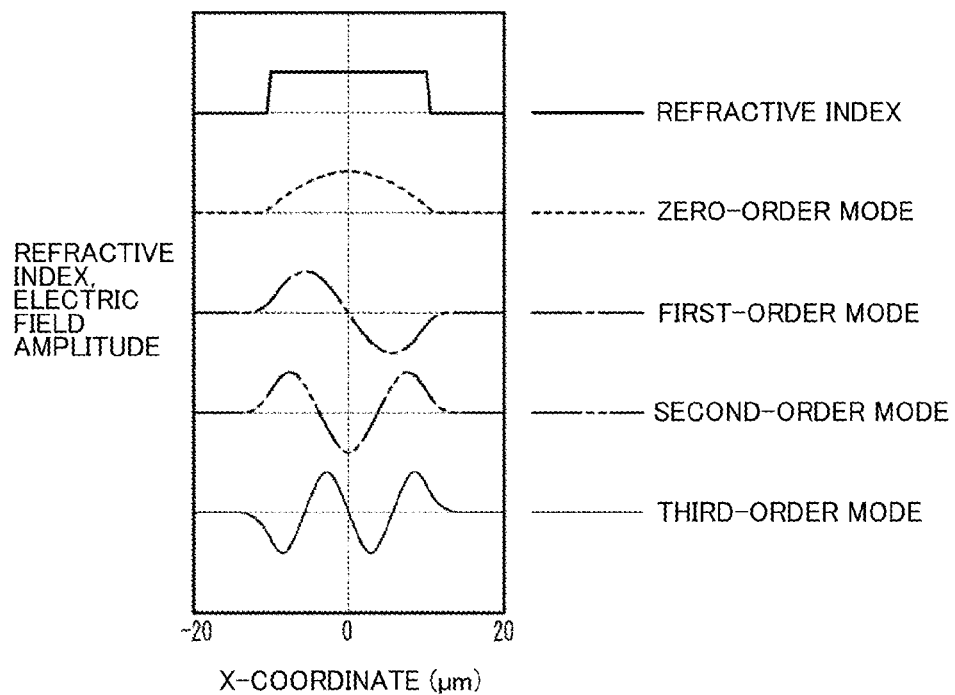
FIG. 14 is a schematic diagram showing the result of calculating the refractive index distribution related to one specification of the multimode waveguide coupling the field modulation device and the downstream AWG of an optical wavelength multi/demultiplexing circuit and the electric field amplitude distribution of propagation modes of different orders.
Figure 15:
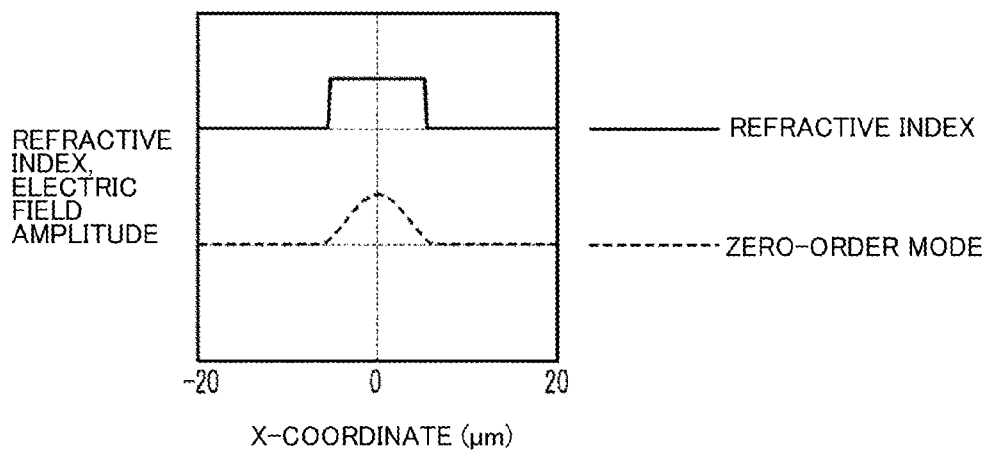
FIG. 15 is a schematic diagram showing the result calculating the refractive index distribution of individual channel output waveguides that are connected to the downstream AWG of an optical wavelength multi/demultiplexing circuit and the electric field amplitude distribution of a zero-order propagation mode.
Figure 16:
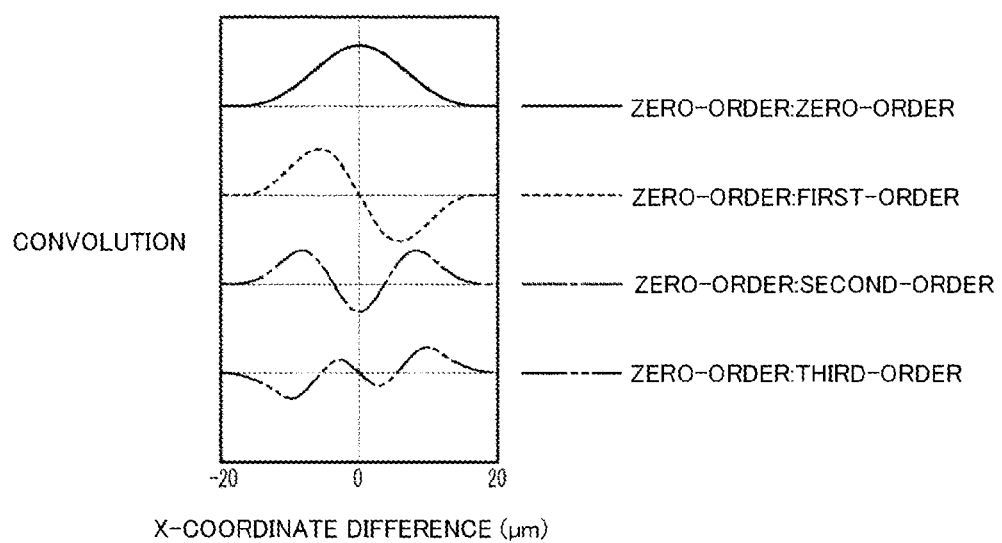
FIG. 16 is a schematic diagram showing the result calculating the convolution with the zero-order mode (fundamental mode) shown in FIG. 15 for each mode in FIG. 14.
Figure 17:
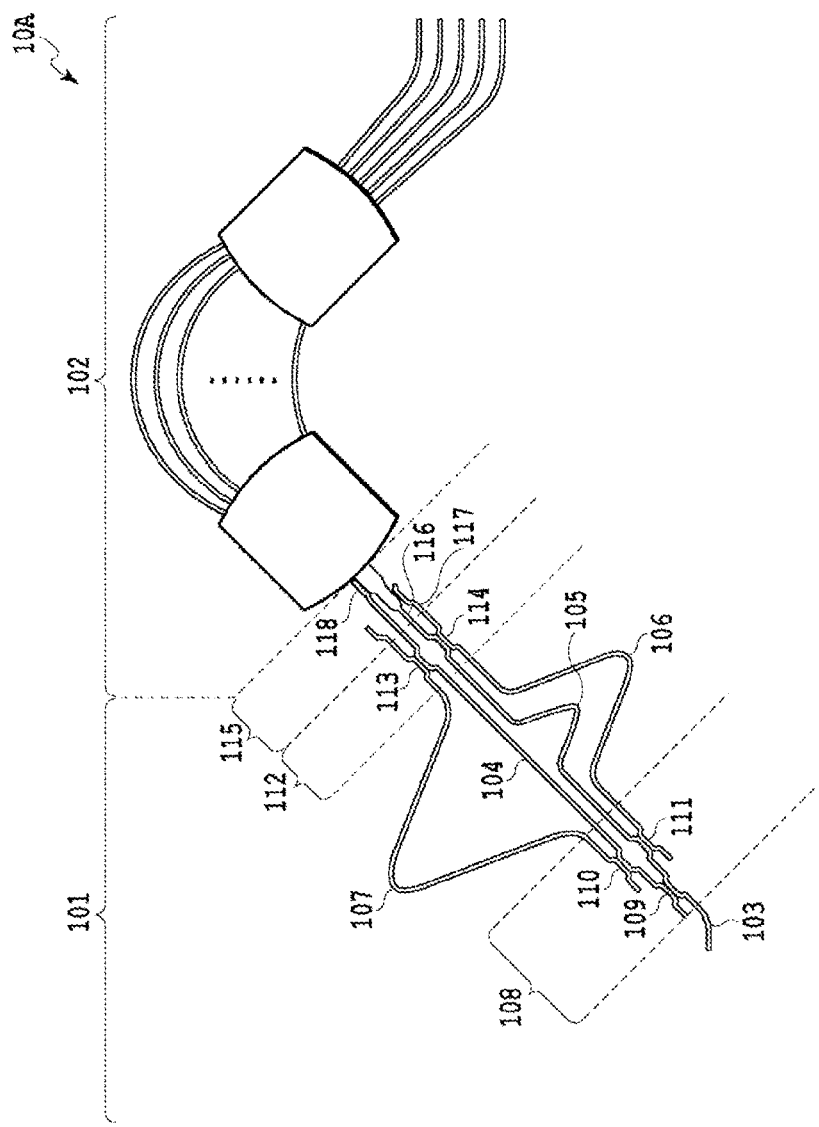
FIG. 17 is a schematic diagram showing the basic configuration of an optical wavelength multi/demultiplexing circuit according to embodiment 1 of the present invention.

FIG. 17 is a schematic view showing the basic configuration of an optical wavelength multi/demultiplexing circuit 10A according to embodiment 1 of the present invention.

As shown in FIG. 17, the optical wavelength multi/demultiplexing circuit 10A according to embodiment 1 of the present invention is constituted by coupling an AWG (Arrayed Waveguide Grating) 102 designed with wavelength channel spacing of 100 GHz and a field modulation device 101 having an optical frequency repetition period (FSR) of 100 GHz.

Of these, the field modulation device 101 is constituted by a common input waveguide 103, an optical branching unit 108, four optical delay lines 104, 105, 106 and 107, a multiplex interference unit 112, and a mode converter/multiplexer 115. Also, the optical branching unit 108 is constituted by a first optical branching element 109 with a branching ratio of 12%, a second optical branching element 110 with a branching ratio of 70%, and a third optical branching element 111 with a branching ratio of 40%. The AWG 102 is constituted by an arrayed waveguide composed of a plurality of channel waveguides, a first slab waveguide and a second slab waveguide connected to the arrayed waveguide, and individual channel output waveguides connected to the second slab waveguide.

Here, $n_e$ is the effective refractive index of the optical delay line at a wavelength ($\lambda$) of 1.55 μm which is a communication wavelength range, $n_g$ is the group refractive index, and c is the speed of light in a vacuum. Also, in order to set the optical frequency repetition period (FSR) of the field modulation device 101 to 100 GHz, a predetermined optical delay length difference $\Delta L$ is set to a value at which the relation $\Delta L=(n_e/n_g)\times(c/FSR)$ is obtained. Furthermore, the length of each optical delay line is designed such that the difference between the optical delay length of the second optical delay line 105 and the optical delay length of the first delay line 104 is $\Delta L$, and the difference between the optical delay length of the third optical delay line 106 and the optical delay length of the first optical delay line 104 is given as $2\Delta L+0.5\lambda/n_e$. Also, the difference between the optical delay length of the fourth optical delay line 107 and the optical delay length of the first optical delay line 104 is given as $3\Delta L+0.5\lambda/n_e$.

Furthermore, the multiplex interference unit 112 includes a first multiplex interference element 113 with a merging ratio of 60% and a second multiplex interference element 114 with a merging ratio of 10%. When the center wavelength of the optical frequency repetition period (FSR) of the field modulation device 101 is given as $\lambda c$, the output of the fourth optical delay line 107 and the output of the first optical delay line 104 are guided to the two input ports of the first multiplex interference element 113. The output that is the intensity maximum at $\lambda c$ out of the two outputs of the first multiplex interference element 113 is then connected to an input port 118 of the mode converter/multiplexer 115 for converting to a second-order traverse mode out of the three input ports of the mode converter/multiplexer 115.

Further, the output of the second optical delay line 105 and the output of the third optical delay line 106 are guided to the two input ports of the second multiplex interference element 114. The output that is the intensity maximum at $\lambda c$ out of the two outputs of the second multiplex interference element 114 is then connected to an input port 116 of the mode converter/multiplexer 115 for converting to a zero-order traverse mode out of the three input ports of the mode converter/multiplexer 115. Also, the output that is the intensity minimum at λc is connected to an input port 117 of the mode converter/multiplexer 115 for converting to a first-order traverse mode out of the three input ports of the mode converter/multiplexer 115.

The optical wavelength multi/demultiplexing circuit 10A is a synchronized AWG, due to the configuration shown in FIG. 17. Also, the number of optical delay lines is four, and satisfies the relation of being an even number of 2N lines (N being a positive integer greater than or equal to 2). Furthermore, the length of each optical delay line also satisfies the relation $L_i=(i-1)\times\Delta L+L_1+\alpha_i$ (i>1), where $\Delta L$ is a predetermined optical delay length difference, $L_i$ is the optical delay length of the ith optical delay line in ascending order of optical delay length, and $\alpha_i$ is the phase adjustment length of the ith optical delay line. Also, $\alpha_i$ satisfies the relation $-10\times(\lambda/n_e)<\alpha_i<10\times(\lambda/n_e)$, where $\lambda$ is the wavelength of signal light, and $n_e$ is the effective refractive index of the optical delay line.

With this optical wavelength multi/demultiplexing circuit 10A, given that the optical delay length difference unit $\Delta L$ is common between the four optical delay lines, the optical frequency repetition period of the field modulation device 101 that incorporates the four optical delay lines will be an integer multiple of the channel spacing of the AWG 102. That is, the optical characteristics of the circuit as a whole are also synchronized with the optical frequency repetition period determined by the optical delay length difference unit $\Delta L$.

Also, the four optical delay lines are connected to the input ports of the mode converter/multiplexer 115 via the multiplex interference elements 113 and 114. Here, by providing an appropriate delay amount to the four optical delay lines, the electric field amplitude of the signal light that is guided to respective input ports of the mode converter/multiplexer 115 achieve ideal optical frequency dependence. Specifically, an appropriate delay amount is provided to each optical delay line, and the repetition period and the position of the minimum or maximum of the output from the multiplex interference elements 113 and 114 are provided.

Note that ideal optical frequency dependence is characterized by the absolute value of odd-order response functions being the minimum, and by the absolute value of even-order response functions being the maximum in the center wavelength λc of the repetition period. Furthermore, the optical frequency characteristics are characterized by the sum of the number of peaks and valleys of the optical frequency response increasing every time the order of the mode increases, regardless of the order being odd or even.

Looking closer, the number of peaks and valleys respectively increase by one every time the order increases by two. Furthermore, the frequency response reverses sign across the point at which the absolute value of all the response functions is zero. To be more precise, the response function here is optical frequency dependent on the electric field amplitude in each mode in the multimode waveguide. Furthermore, in the case of using the mode converter/multiplexer 115 in which the ratio of the electric field amplitude of the signal light that is guided to respective input ports and the electric field amplitude of respective higher order modes that are excited in the multimode waveguide that serves as an output is constant, the response function here will be identical to the optical frequency dependence of the electric field amplitude of signal light that is guided to respective input ports of the mode converter/multiplexer 115.

In order to attain the ideal optical frequency serving as the above object, the lengths of the optical delay lines are configured as described above. As a result, with the 2j−2th order and 2j−1th order traverse modes in the multimode waveguide of the field modulation device 101, optical frequency dependence with a repetition period of $c/\{(2j-1)\times(n_g/n_e)\times\Delta L\}$ is provided, where c is the speed of light in a vacuum, $n_e$ is the effective refractive index of the optical delay line, and $n_g$ is the group refractive index. Furthermore, the position of the minimum or maximum of optical frequency dependence will be the intensity maximum at the field center wavelength λc in even number 2j−2th order traverse modes and will be the intensity minimum in odd number 2j−1th order traverse modes, depending on the setting of $\alpha_{N+1-j}$ and $\alpha_{N+j}$. Also, with the field modulation device 101 according to embodiment 1, a two-beam interferometer is used, and thus, in the traverse modes of the respective orders, the electric field amplitude reverses across the wavelength at which the intensity minimum is reached, and the sign thereof can be determined by the setting of $\alpha_{N+1-j}$ and $\alpha_{N+j}$.

Due to the above design matters, it becomes possible to provide frequency dependence required in order for the synchronized AWG to have low loss and a flat transmission loss spectrum in the electric field amplitude of each higher order mode of the multimode waveguide that is the exit port of the field modulation device 101.

Figure 18:
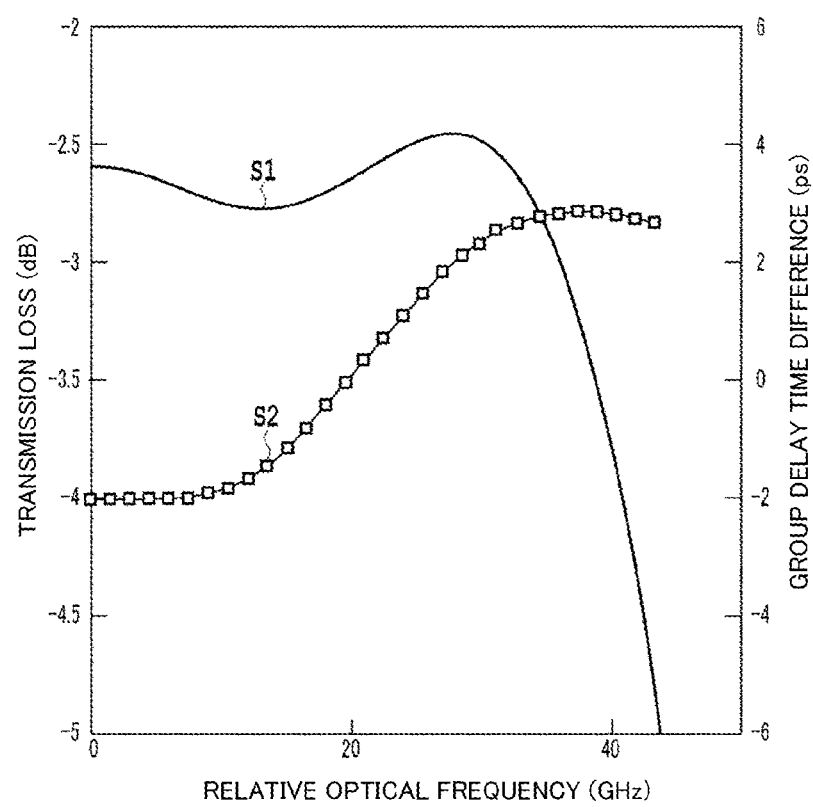
FIG. 18 is an enlarged view of the transmission region of the optical wavelength multi/demultiplexing circuit of embodiment 1, and is a diagram showing transmission loss spectral characteristics and group delay time spectral characteristics indicating transmission phase characteristics, with the horizontal axis being relative optical frequency.
Figure 19:
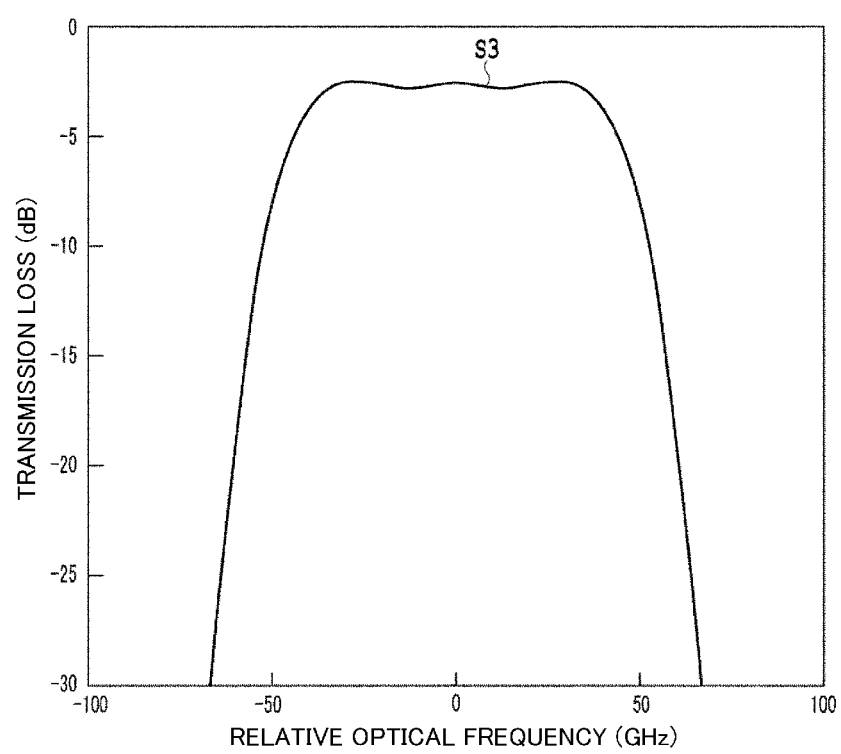
FIG. 19 is a diagram showing overall transmission loss spectral characteristics of the optical wavelength multi/demultiplexing circuit of embodiment 1 as a relation of transmission loss to relative optical frequency.

FIG. 18 is an enlarged view of the transmission region of the optical wavelength multi/demultiplexing circuit 10A of embodiment 1, and is a diagram showing transmission loss spectral characteristics S1 and group delay time spectral characteristics S2 indicating transmission phase characteristics, with the horizontal axis being relative optical frequency. FIG. 19 is a diagram showing overall transmission loss spectral characteristics S3 as a relation of transmission loss to relative optical frequency.

Referring to FIGS. 18 and 19, it is evident that the transmission loss of the transmission loss spectral characteristics S1 is 2.8 dB, and the excess loss due to flattening is reduced to 1 dB or less compared to the excess loss of approximately 2 dB of the AWG 102 alone. Also, it is evident that the 1 dB width of the transmission region of the overall transmission loss spectral characteristics S3 is 77 GHz, and the amount of loss variation of the transmission loss spectral characteristics S1 is 0.32 dB. Furthermore, it is evident that the cutoff region width in a 3 dB to 20 dB range of the amount of transmission loss increase of the overall transmission loss spectral characteristics S3 is 36 GHz, and the group delay variation (group delay time difference) of the group delay time spectrum characteristics S2 is 4.9 ps. As a result, it was ascertained that a rectangular transmission loss spectrum substantially comparable to the case of the synchronized AWG of PTL 7 is obtained.

Embodiment 2

Figure 20:
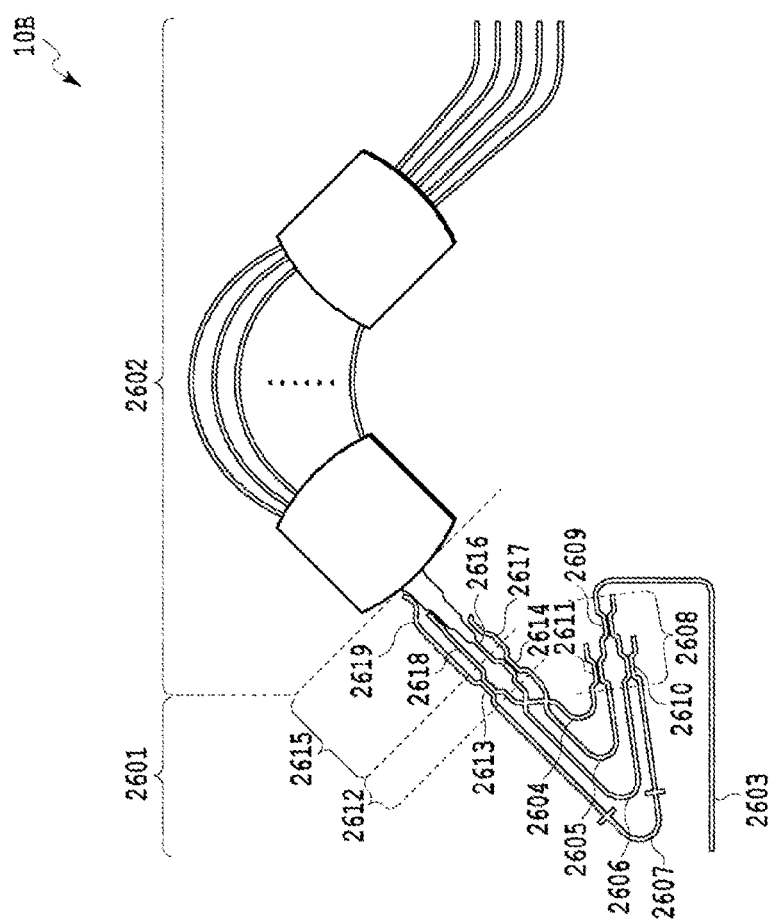
FIG. 20 is a schematic diagram showing the basic configuration of an optical wavelength combined wave circuit according to embodiment 2 of the present invention.

FIG. 20 is a schematic view showing the basic configuration of an optical wavelength multi/demultiplexing circuit 10B according to embodiment 2 of the present invention.

As shown in FIG. 20, the optical wavelength multi/demultiplexing circuit 10B according to embodiment 2 of the present invention is constituted by coupling an AWG (Arrayed Waveguide Grating) 2602 designed with wavelength channel spacing of 100 GHz and a field modulation device 2601 having an optical frequency repetition period (FSR) of 100 GHz.

Of these, the field modulation device 2601 is constituted by a common input waveguide 2603, an optical branching element 2608, four optical delay lines 2604, 2605, 2606 and 2607, a multiplex interference unit 2612, and a mode converter/multiplexer 2615. The optical branching unit 2608 is constituted by a first optical branching element 2609 with a branching ratio of 15% and a second optical branching element 2610 and a third optical branching element 2611 with branching ratios of 50%. The AWG 2602 is constituted by an arrayed waveguide composed of a plurality of channel waveguides, a first slab waveguide and a second slab waveguide connected to the arrayed waveguide, and individual channel output waveguides connected to the second slab waveguide.

As a result, the distribution ratio from the optical branching unit 2608 to the four optical delay lines 2604, 2605, 2606 and 2607 is designed to be 7.5%, 42.5%, 42.5% and 7.5%. Note that this distribution ratio satisfies the relation δ:50%–δ:50%–δ:5. Here, δ=7.5% and δ also satisfies the relation of being 3% to 13% inclusive.

Also, the relation $\Delta L=(n_e/n_g)\times(c/FSR)$ is obtained, where c is the speed of light in a vacuum, 100 GHz is the optical frequency repetition period (FSR) of the field modulation device 2601, $n_e$ is the effective refractive index of the optical delay line, $n_g$ is the group refractive index, and $\Delta L$ is a predetermined optical delay length difference. In view of this, the length of each optical delay line is designed such that the difference between the optical delay length of the second optical delay line 2605 and the optical delay length of the first delay line 2604 is $\Delta L$, and the difference between the optical delay length of the third optical delay line 2606 and the optical delay length of the first optical delay line 2604 is given as $2\Delta L$. Also, the difference between the optical delay length of the fourth optical delay line 2607 and the optical delay length of the first optical delay line 2604 is given as $3\Delta L$.

Furthermore, the multiplex interference unit 2612 includes a first multiplex interference element 2613 and a second multiplex interference element 2614 with merging ratios of 50%. When the center wavelength of the optical frequency repetition period (FSR) of the field modulation device 2601 is given as $\lambda c$, the output of the fourth optical delay line 2607 and the output of the first optical delay line 2604 are guided to the two input ports of the first multiplex interference element 2613. The output that is the intensity maximum at $\lambda c$ out of the two outputs of the first multiplex interference element 2613 is then connected to an input port 2618 of the mode converter/multiplexer 2615 for converting to a second-order traverse mode out of the three input ports of the mode converter/multiplexer 2615. Also, the output that is the intensity minimum at $\lambda c$ is connected to an input port 2619 of the mode converter/multiplexer 2615 for converting to a third-order traverse mode.

Further, the output of the second optical delay line 2605 and the output of the third optical delay line 2606 are guided to the two input ports of the second multiplex interference element 2614. The output that is the intensity maximum at $\lambda c$ out of the two outputs of the second multiplex interference element 2614 is then connected to an input port 2616 of the mode converter/multiplexer 2615 for converting to a zero-order traverse mode out of the three input ports of the mode converter/multiplexer 2615. Also, the output that is the intensity minimum at $\lambda c$ is connected to an input port 2617 of the mode converter/multiplexer 2615 for converting to a first-order traverse mode.

Additionally, in order to negate the influence of loss and the like that occur due to the first optical delay line 2604 intersecting the second optical delay line 2605 and the third optical delay line 2606, a dummy crossing waveguide is provided at two locations in the fourth optical delay line 2607.

The optical wavelength multi/demultiplexing circuit 10B having the related configuration is also a synchronized AWG. With regard also to the 2N optical delay lines here, the optical delay length $L_i$ satisfies the relation $L_i=(i-1)\times \Delta L+L_1+\alpha_i$ (i>1) under conditions similar to embodiment 1. The phase adjustment length $\alpha_i$ of the ith optical delay line also satisfies the relation $-10\times(\lambda/n_e)<\alpha_i<10\times(\lambda/n_e)$.

With regard also to this optical wavelength multi/demultiplexing circuit 10B, given that the optical delay length difference unit $\Delta L$ is common between the 2N optical delay lines in the field modulation device 2601, the optical frequency repetition period of the field modulation device 2601 will be an integer multiple of the channel spacing of the AWG 2602. Also, the output signals of the 2N optical delay lines are connected to the input ports of the mode convertor/multiplexer 2615, via the multiplex interference elements 2613 and 2614, and the output light of the multiplex interference elements 2613 and 2614 is guided to respective input ports of the mode convertor/multiplexer 2615 and converted into higher order mode light in the multimode waveguide that is the exit port of the field modulation device 2601.

In order that each higher order mode light might furthermore have a flat transmission loss spectrum by the synchronous AWG as a whole finally by acquiring ideal optical frequency dependence as well as the case of embodiment 1, the length of each optical delay line was made into the length of the description in described above. Further, so as to have a flat transmission phase spectrum, the distribution ratio of optical branching unit 2608 is given as the distribution ratio described above, and the merging ratios of the multiplex interference elements 2613 and 2614 are given as the merging ratios described above.

Figure 21:
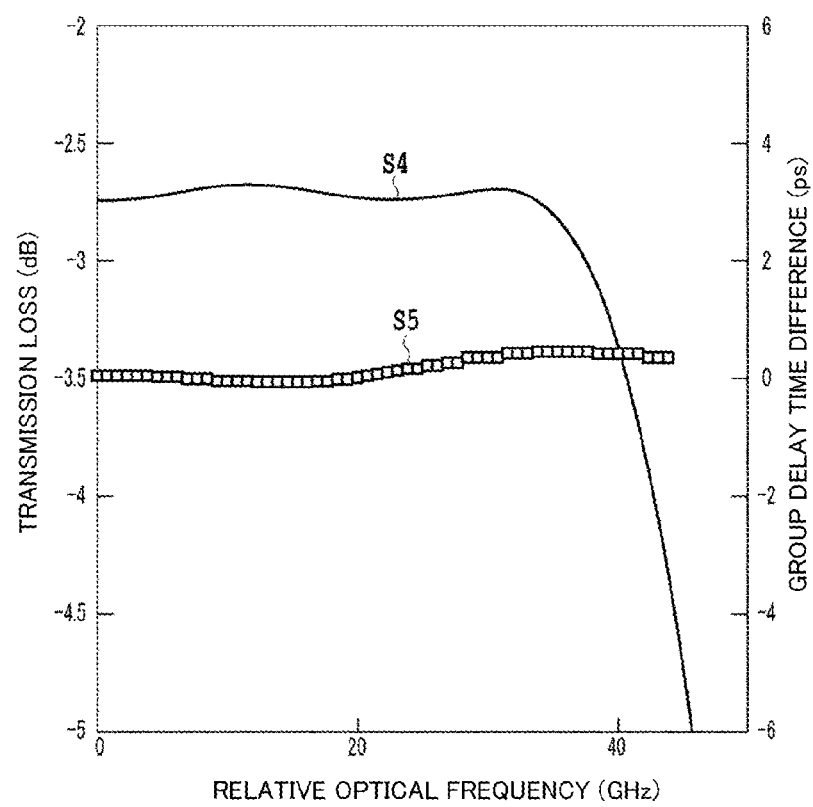
FIG. 21 is an enlarged view of the transmission region of the optical wavelength multi/demultiplexing circuit of embodiment 2, and is a diagram showing transmission loss spectral characteristics and group delay time spectral characteristics indicating transmission phase characteristics, with the horizontal axis being relative optical frequency.
Figure 22:
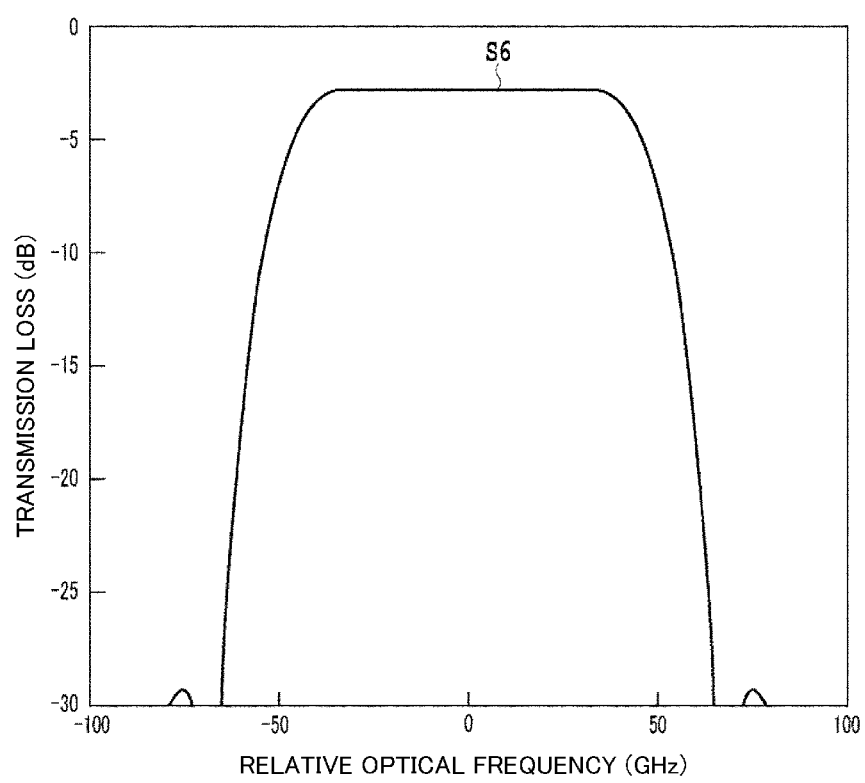
FIG. 22 is a diagram showing overall transmission loss spectral characteristics of the optical wavelength multi/demultiplexing circuit of embodiment 2 as a relation of transmission loss to relative optical frequency.

FIG. 21 is an enlarged view of the transmission region of the optical wavelength multi/demultiplexing circuit 10B, and is a diagram showing transmission loss spectral characteristics S4 and group delay time spectral characteristics S5 indicating transmission phase characteristics, with the horizontal axis being relative optical frequency. FIG. 22 is a diagram showing overall transmission loss spectral characteristics S6 of the optical wavelength multi/demultiplexing circuit 10B as a relation of transmission loss to relative optical frequency.

Referring to FIGS. 21 and 22, it is evident that the transmission loss of the transmission loss spectral characteristics S4 is 2.7 dB, and the 1 dB width of the transmission region of the overall transmission loss spectral characteristics S6 is 83 GHz. Also, it is evident that the amount of loss variation of the transmission loss spectral characteristics S4 is not more than 0.1 dB, and the cutoff region width in a 3 dB to 20 dB range of the amount of transmission loss increase of the overall transmission loss spectral characteristics S6 is approximately 30 GHz. Furthermore, it is evident that the group delay variation (group delay time difference) of the group delay time spectrum characteristics S5 is 0.5 ps. It is inferred that the slight group delay variation remaining in the group delay time spectrum characteristics S5, is due to the branching ratio of the four elements, namely, the second optical branching element 2610, the third optical branching element 2611, the first multiplex interference element 2613 and the second multiplex interference element 2614, that are supposed to have branching ratios of 50% ends up being 53% because of design shift.

Figure 23:
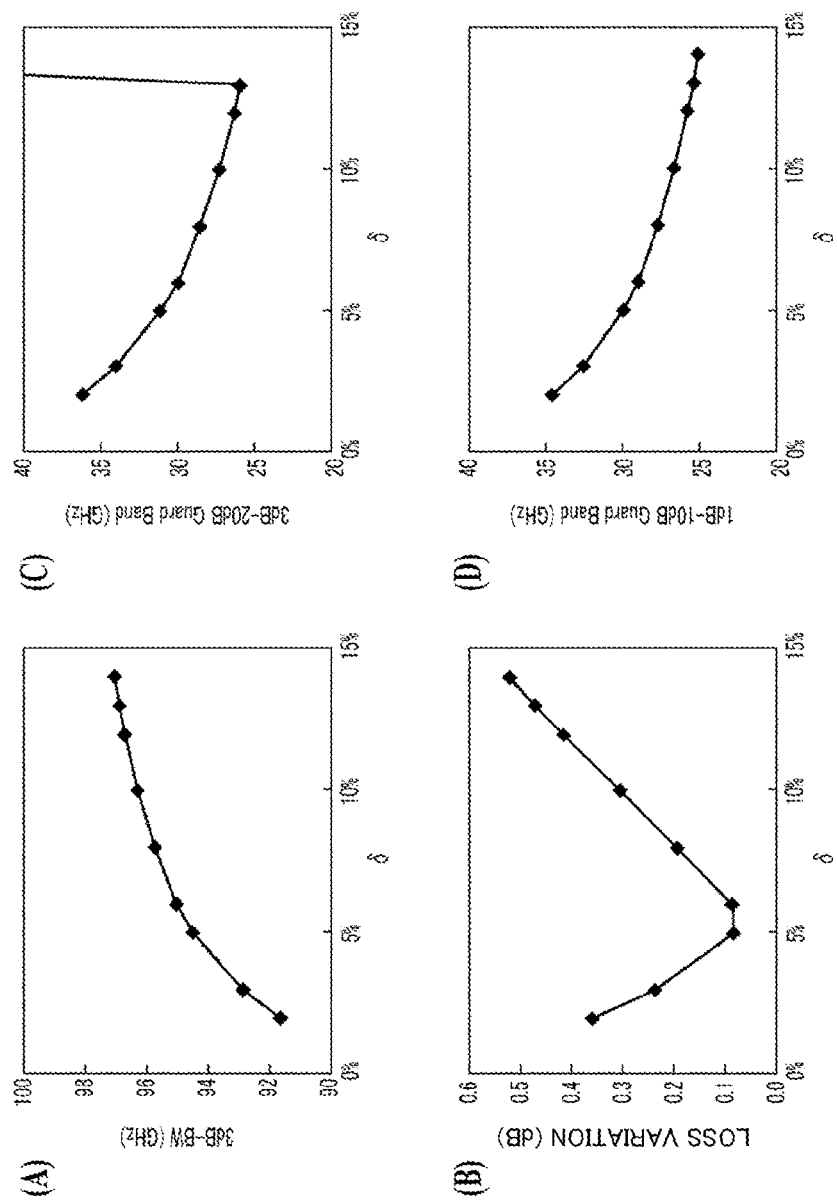
FIG. 23 is the calculation result of simulation of transmission characteristics with respect to a distribution ratio related to an optical branching unit of the optical wavelength multi/demultiplexing circuit of embodiment 2, where (A) is the distribution ratio dependence of a 3 dB width, (B) is the distribution ratio dependence of loss variation, (C) is the distribution ratio dependence of the guard bandwidth in the case where a 3 dB to 20 dB range of the amount of transmission loss increase is taken as the cutoff region, and (D) is the distribution ratio dependence of the guard bandwidth in the case where a 1 dB to 10 dB range of the amount of transmission loss increase is taken as the cutoff region.

FIG. 23 is a simulation calculation result of transmission characteristics with respect to a distribution ratio δ related to the optical branching unit 2608 of the optical wavelength multi/demultiplexing circuit 10B of embodiment 2. (A) is the distribution ratio dependence of a 3 dB width, and (B) is the distribution ratio dependence of loss variation. (C) is the distribution ratio dependence of the guard bandwidth in the case where a 3 dB to 20 dB range of the amount of transmission loss increase is taken as the cutoff region, and (D) is the distribution ratio dependence of the guard bandwidth in the case where a 1 dB to 10 dB range of the amount of transmission loss increase is taken as the cutoff region. Note that, in FIG. 23, the synchronized AWG is constituted by a silica-based buried waveguide having a refractive index difference of Δ7.5%, with channel spacing of 100 GHz, and a coupling angle α is assumed. The transmission characteristics in this case are shown as distribution ratio δ on the horizontal axis, whereas the vertical axis is shown as band or loss variation.

It was found from the calculation results for the 3 dB width in FIG. 23(A) that a wide bandwidth greater than or equal to 90 GHz is obtained in 3% to 14% which is the entire region of the calculated coupling angle α. It was found from the calculation results for loss variation in FIG. 23(B) that flatness less than or equal to 5 dB is obtained when the coupling angle α is less than or equal to 13%. It was found from the calculation results for 3 dB guard band in FIG. 23(C) that a narrow bandwidth less than or equal to 35 GHz is obtained when the coupling angle α is 3% to 13% inclusive. It was found from the calculation results for 3 dB guard band in FIG. 23(D) that a narrow bandwidth less than or equal to 35 GHz is obtained in 3% to 14% which is the entire region of the coupling angle α.

That is, with the optical wavelength multi/demultiplexing circuit 10B, if the distribution ratio of the optical branching unit 2608 is optimized as described above, loss flatness of the transmission region is secured with a wide transmission width of 3 dB and a narrow guard bandwidth can be realized, even with four delay lines. In other words, with the wavelength multi/demultiplexer 10B, it becomes possible to secure flatness in the transmission region with a wide 3 dB width and to provide a narrow guard bandwidth, even with a small number of delay lines such as four lines in the field modulation device 2601.

As described above, the optical wavelength multi/demultiplexing circuit 10B of embodiment 2 is a synchronized AWG with a high rectangular transmission loss spectrum that is able to secure loss flatness of the transmission band, maintain/reduce the guard bandwidth of wavelength channel spacing, and broaden the transmission bandwidth. Furthermore, in this synchronized AWG, phase flatness of the transmission band is also improved compared to the case of embodiment 1.

Generally speaking, to further broaden the transmission bandwidth or to further reduce the transition region between wavelength channels, it is preferable to increase the total number of the traverse modes that are controlled by the field modulation device 2601. However, there is a problem in that degree of difficulty at the time of synchronized AWG production increases as the number of optical delay lines in the field modulation device 2601 is increased or the optical delay amount is increased, causing manufacture yield to deteriorate. However, if the optical wavelength multi/demultiplexing circuit 10B according to embodiment 2 is used, loss flatness of the transmission band, guard bandwidth, transmission bandwidth and the like can be further improved at the same time, without causing manufacture yield to deteriorate. Moreover, it becomes possible to also reduce the nonlinearity of transmission phase characteristics at the same time, and to provide a synchronized AWG with a high rectangular transmission loss spectrum, even with a small number of optical delay lines such as four lines.

Embodiment 3

Figure 24:
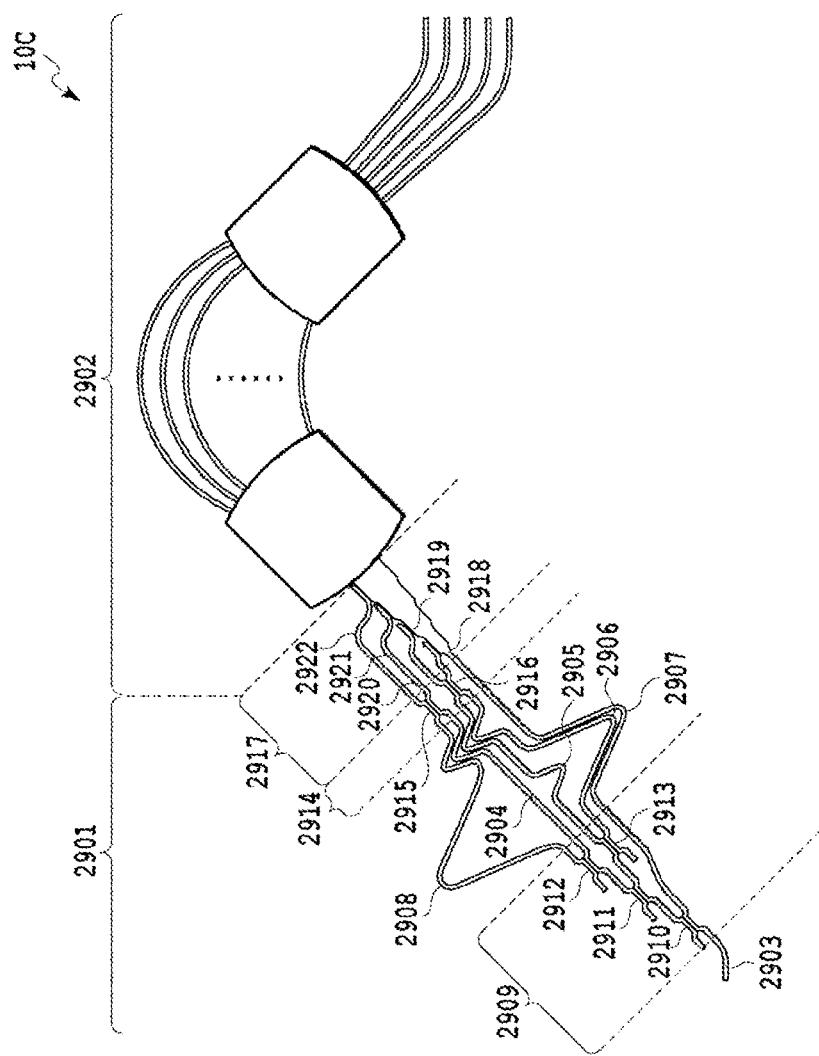
FIG. 24 is a schematic diagram showing the basic configuration of an optical wavelength combined wave circuit according to embodiment 3 of the present invention.

FIG. 24 is a schematic view showing the basic configuration of an optical wavelength multi/demultiplexing circuit 10C according to embodiment 3 of the present invention.

Referring to FIG. 24, the optical wavelength multi/demultiplexing circuit 10C according to embodiment 3 of the present invention is constituted by coupling an AWG (Arrayed Waveguide Grating) 2902 designed with wavelength channel spacing of 200 GHz and a field modulation device 2901 having an optical frequency repetition period (FSR) of 200 GHz.

Of these, the field modulation device 2901 is constituted to include a common input waveguide 2903, an optical branching unit 2909, and five optical delay lines 2904, 2905, 2906, 2907 and 2908. Also, the field modulation device 2901 includes a multiplex interference unit 2914 and a mode converter/multiplexer 2917. The optical branching unit 2909 is constituted by a first optical branching element 2910 with a branching ratio of 46%, a second optical branching element 2911 with a branching ratio of 9.5%, and a third optical branching element 2912 and a third optical branching element 2913 with branching ratios of 50%. The AWG 2902 is constituted by an arrayed waveguide composed of a plurality of channel waveguides, a first slab waveguide and a second slab waveguide connected to the arrayed waveguide, and individual channel output waveguides connected to the second slab waveguide.

As a result, the distribution ratio from the optical branching unit 2909 to the five optical delay lines 2904, 2905, 2906, 2907 and 2908 will be 2%, 21%, 54%, 21% and 2%. Additionally, a predetermined optical delay length difference at which the relation $\Delta L=(n_e/n_g)\times(c/FSR)$ is obtained is given as $\Delta L$, where c is the speed of light in a vacuum, 100 GHz is the optical frequency repetition period (FSR) of the field modulation device 2901, $n_e$ is the effective refractive index of the optical delay line, $n_g$ is the group refractive index.

In view of this, the length of each optical delay line is designed such that the difference between the optical delay length of the third optical delay line 2906 and the optical delay length of the first optical delay line 2904 will be $2\Delta L$, such that the difference between the optical delay length of the second optical delay line 2905 and the optical delay length of the first delay line 2904 will be $\Delta L+0.5\lambda/n_e$. Also, the length of each optical delay line is designed such that the difference between the optical delay length of the fifth optical delay line 2908 and the optical delay length of the first optical delay line 2904 will be $4\Delta L$, such that the difference between the optical delay length of the second optical delay line 2907 and the optical delay length of the first delay line 2904 will be $\Delta L+0.5\lambda/n_e$.

Furthermore, the multiplex interference unit 2914 includes a first multiplex interference element 2915 and a second multiplex interference element 2916 with merging ratios of 50%. The output of the fifth optical delay line 2908 and the output of the first optical delay line 2904 are then guided to the two input ports of the first multiplex interference element 2915. Furthermore, when the center wavelength of the optical frequency repetition period (FSR) of the field modulation device 2901 is given as λc, the output that is the intensity minimum at λc out of the two outputs of the first multiplex interference element 2915 is then connected to an input port 2921 of the mode converter/multiplexer 2917 for converting to a third-order traverse mode out of the four input ports of the mode converter/multiplexer 2917. Also, the output that is the intensity maximum at λc is connected to an input port 2922 of the mode converter/multiplexer 2917 for converting to a fourth-order traverse mode.

Further, the output of the second optical delay line 2905 and the output of the fourth optical delay line 2906 are guided to the two input ports of the second multiplex interference element 2916. The output that is the intensity minimum at λc out of the two outputs of the second multiplex interference element 2916 is then connected to an input port 2919 of the mode converter/multiplexer 2917 for converting to a first-order traverse mode out of the four input ports of the mode converter/multiplexer 2917. Also, the output that is the intensity maximum at λc is connected to an input port 2920 of the mode converter/multiplexer 2917 for converting to a second-order traverse mode. Additionally, the output of the third optical delay line 2905 is connected to an input port 2918 of the mode converter/multiplexer 2917 for converting to a zero-order traverse mode.

The optical wavelength multi/demultiplexing circuit 10C having the related configuration is also a synchronized AWG. The number of optical delay line here is an odd number five. With the 2N+1 optical delay lines (N being a positive integer greater than or equal to 2), the case where the predetermined optical delay length is given as ΔL, the optical delay length of the ith optical delay line in ascending order of optical delay length is given as $L_i$, and the phase adjustment length of the ith optical delay line is given as $\alpha_i$ is assumed. In this case, the optical delay length $L_i$ satisfies the relation $L_i=(i-1)\times\Delta L+L_1+\alpha_i(i>1)$. Also, $\alpha_i$ satisfies the relation $-10\times(\lambda/n_e)<\alpha_i<10\times(\lambda/n_e)$, where λ is the wavelength of signal light, and $n_e$ is the effective refractive index of the optical delay line.

In this optical wavelength multi/demultiplexing circuit 10C, the output from one optical delay line is guided to the mode converter/multiplexer 2917 with a flat optical frequency response, without passing through the multiplex interference elements 2915 and 2916. However, the remaining even number of optical delay lines constitute the multiplex interference elements 2915 and 2916 and a two-beam interferometer, and the output thereof connects to the mode converter/multiplexer 2917. It becomes possible to also flatten the transmission loss characteristics of the synchronized AWG when the number of optical delay lines is odd, by providing the repetition period and minimum or maximum position of the output from the multiplex interference elements 2915 and 2916, such that the electric field amplitude of the signal light that is guided to respective input ports of the mode converter/multiplexer 2917 achieve ideal optical frequency dependence.

Note that ideal optical frequency dependence is characterized by the absolute value of odd-order response functions being the minimum, and by the integral value of even-order response functions being the maximum in the center wavelength λc of the repetition period, the same as when the number of optical delay lines is even. Furthermore, the optical frequency characteristics are characterized by the sum of the number of peaks and valleys of the optical frequency response increasing every time the order of the mode increases, regardless of the order being odd or even. Looking closer, the number of peaks and valleys respectively increase by one every time the order increases by two.

Furthermore, the frequency response reverses sign across the point at which the absolute value of all the response functions is zero. To be more precise, the response function here is optical frequency dependent on the electric field amplitude in each mode in the multimode waveguide.

In order to attain the above object, the lengths of the optical delay lines are configured as described in above. As a result, with the 2j−1th order and 2jth order traverse modes in the multimode waveguide of the field modulation device 2901, optical frequency dependence with a repetition period of $c/\{(2j-1)\times(n_g/n_e)\times\Delta L\}$ is provided, where c is the speed of light in a vacuum, $n_e$ is the effective refractive index of the optical delay line, and $n_g$ is the group refractive index. Note that, here, j is a natural number greater than 1. Furthermore, the position of the minimum or maximum of optical frequency dependence will be the intensity minimum at the field center wavelength λc in odd number 2j−1th order traverse modes and will be the intensity maximum in even number 2jth order traverse modes, depending on the setting of $\alpha_{N+1-j}$ and $\alpha_{N+1+j}$. Also, similarly with the field modulation device 2901 according to embodiment 3, in the traverse modes of the respective orders generated from output using a two-beam interferometer, the electric field amplitude reverses across the wavelength at which the intensity minimum is reached, and the sign thereof can be determined by the setting of $\alpha_{N+1-j}$ and $\alpha_{N+1+j}$.

Due to the above design matters, even in the case where the number of optical delay lines is 2N+1, the synchronized AWG has low loss and a flat transmission loss spectrum in the electric field amplitude of each higher order mode of the multimode waveguide that is the exit port of the field modulation device 2901. That is, it becomes possible to provide frequency dependence required for a flat transmission loss spectrum.

Figure 25:
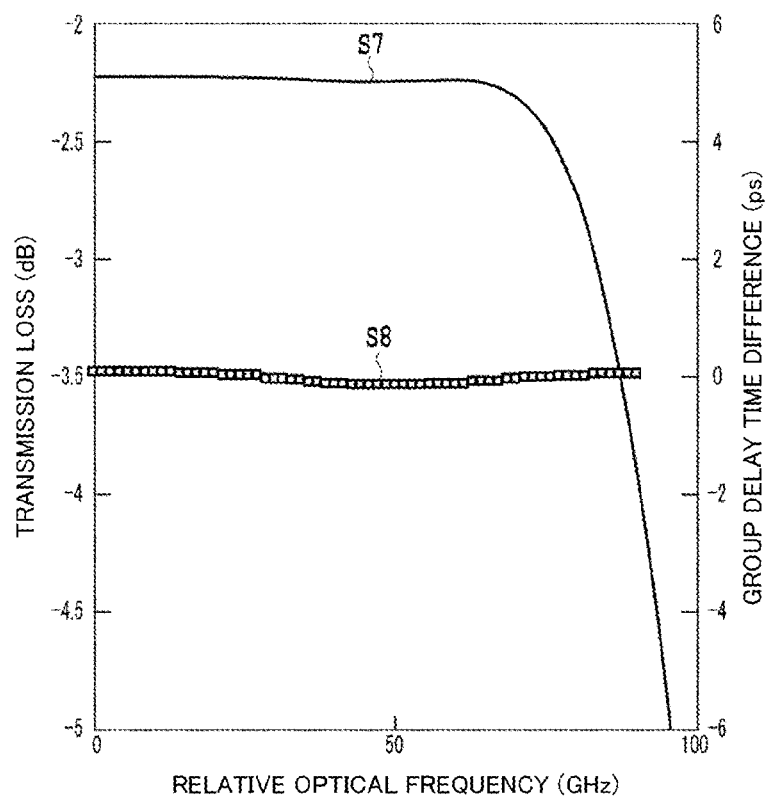
FIG. 25 is an enlarged view of the transmission region of the optical wavelength multi/demultiplexing circuit of embodiment 3, and is a diagram showing transmission loss spectral characteristics and group delay time spectral characteristics indicating transmission phase characteristics, with the horizontal axis being relative optical frequency.
Figure 26:
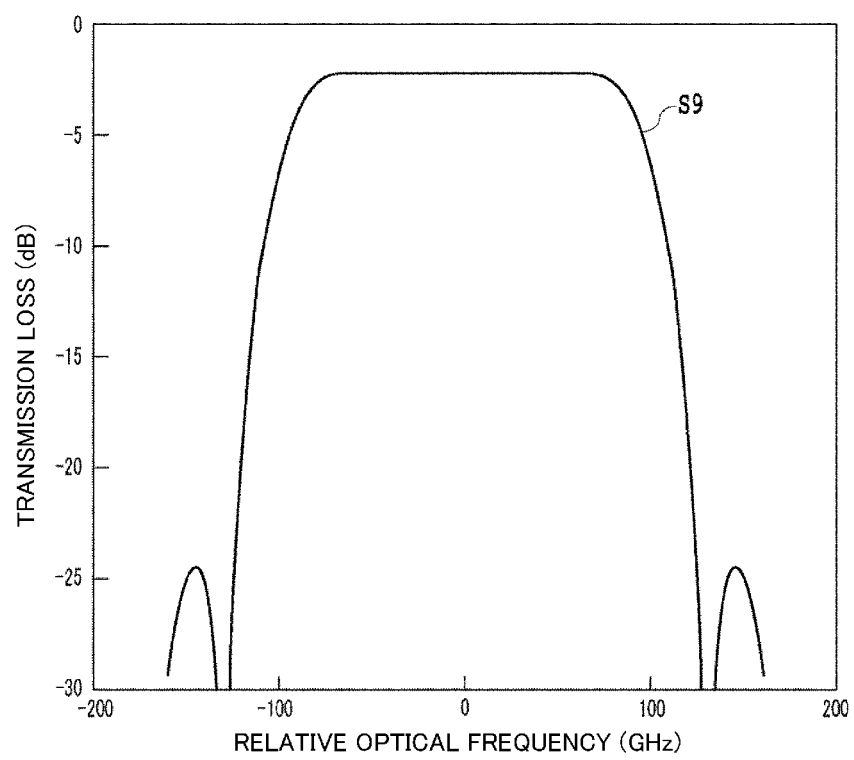
FIG. 26 is a diagram showing overall transmission loss spectral characteristics of the optical wavelength multi/demultiplexing circuit of embodiment 3 as a relation of transmission loss to relative optical frequency.

FIG. 25 is an enlarged view of the transmission region of the optical wavelength multi/demultiplexing circuit 10C of embodiment 3, and is a diagram showing transmission loss spectral characteristics S7 and group delay time spectral characteristics S8 indicating transmission phase characteristics, with the horizontal axis being relative optical frequency. FIG. 26 is a diagram showing overall transmission loss spectral characteristics S9 as a relation of transmission loss to relative optical frequency.

Referring to FIGS. 25 and 26, it is evident that the transmission loss of the transmission loss spectral characteristics S7 is 2.25 dB, and the 1 dB width of the transmission region of the overall transmission loss spectral characteristics S8 is 170 GHz. Also, it is evident that the amount of loss variation of the transmission loss spectral characteristics S7 is not more than 0.1 dB, and the cutoff region width in a 3 dB to 20 dB range of the amount of transmission loss increase of the overall transmission loss spectral characteristics S6 is approximately 53 GHz. Furthermore, it is evident that the group delay variation (group delay time difference) of the group delay time spectrum characteristics S8 is not more than 0.2 ps.

Further, for example, if all the merging ratios of the multiplex interference elements 2915 and 2916 of the multiplex interference unit 2914 are set to 50:50, the group delay time spectrum characteristics S8 can also be flattened, in addition to the transmission loss spectral characteristics S7 that appear in the light wavelength multi/demultiplexer 10C. This means that the nonlinearity of transmission phase characteristics can also be reduced at the same time.

Figure 27:
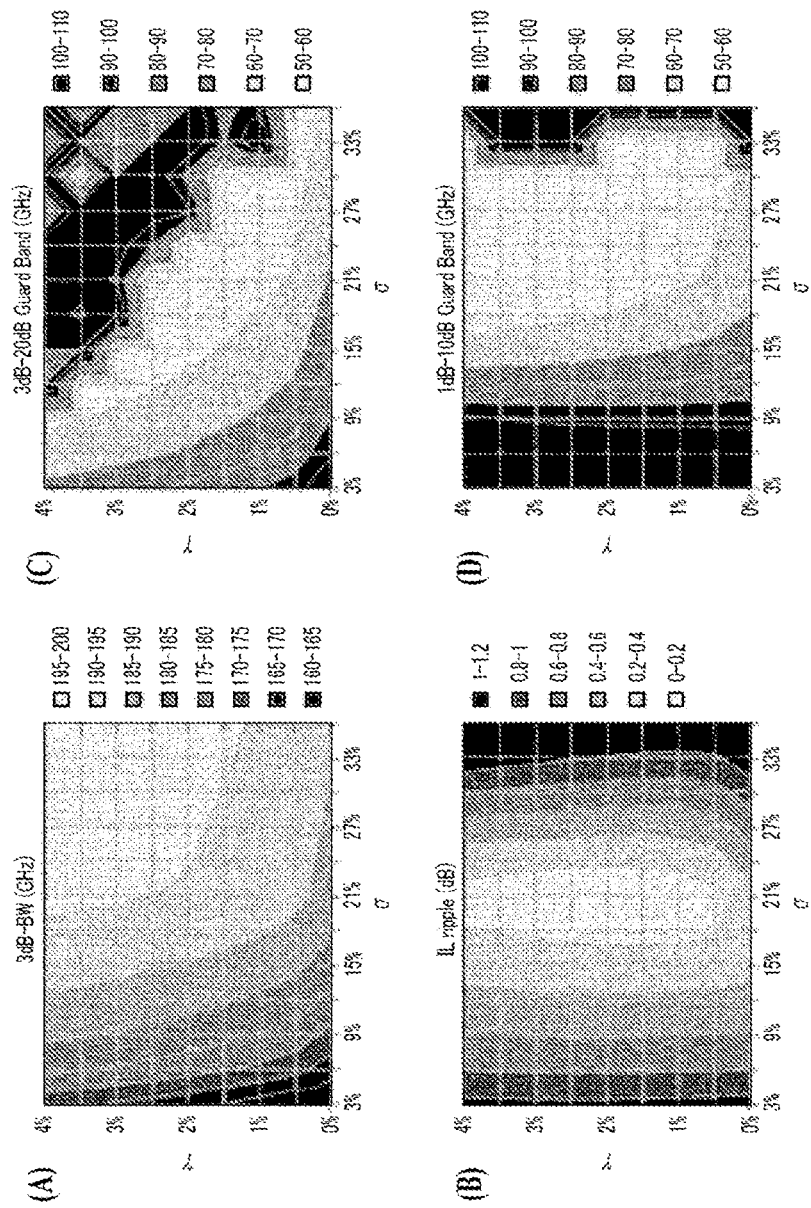
FIG. 27 is a simulation calculation result of transmission characteristics relative to two distribution ratio related to an optical branching unit of the optical wavelength multi/demultiplexing circuit of embodiment 3, where (A) is the distribution ratio dependence of a 3 dB width, (B) is the distribution ratio dependence of loss variation, (C) is the distribution ratio dependence of the guard bandwidth in the case where a 3 dB to 20 dB range of the amount of transmission loss increase is taken as the cutoff region, and (D) is the distribution ratio dependence of the guard bandwidth in the case where a 1 dB to 10 dB range of the amount of transmission loss increase is taken as the cutoff region.

FIG. 27 is a simulation calculation result of transmission characteristics with respect to two distribution ratios related to the optical branching unit 2909 of the optical wavelength multi/demultiplexing circuit 10C of embodiment 3. (A) is the distribution ratio dependence of a 3 dB width, and (B) is the distribution ratio dependence of loss variation. (C) is the distribution ratio dependence of the guard bandwidth in the case where a 3 dB to 20 dB range of the amount of transmission loss increase is taken as the cutoff region, and (D) is the distribution ratio dependence of the guard bandwidth in the case where a 1 dB to 10 dB range of the amount of transmission loss increase is taken as the cutoff region. Note that, in FIG. 27, the transmission characteristics in the case where the synchronized AWG is constituted by a silica-based buried waveguide having a refractive index difference of 07.5%, with channel spacing of 200 GHz are indicated by the relation of the distribution ratio γ of the vertical axis to the distribution ratio δ of the horizontal axis.

Comparing FIGS. 27(A) to 27(D), the conditions under which the loss variation is less than or equal to 0.5 dB at a 3 dB width greater than or equal to 180 GHz, in a range in which the distribution ratio γ is not more than 3% and the distribution ratio δ is 15% to 30%, are noted. Also, the conditions under which the guard bandwidth from 3 dB to 20 dB of the amount of transmission loss increase is less than or equal to 60 GHz are noted. Furthermore, the conditions under which the guard bandwidth from 1 dB to 10 dB of the amount of transmission loss increase is less than or equal to 60 GHz are noted. This enables the combinations of δ and γ capable of achieving a transmission loss spectrum closes approaching a rectangle that satisfies the respective conditions to be confirmed.

That is, with the optical wavelength multi/demultiplexing circuit 10C, if the distribution ratio of the optical branching unit 2909 is optimized as described above, loss flatness of the transmission region is secured with a wide transmission width of 3 dB and a narrow guard bandwidth can be realized, even with five delay lines. In other words, with the wavelength multi/demultiplexer 10C, it becomes possible to secure flatness in the transmission region with a wide 3 dB width and to provide a narrow guard bandwidth, even with a small number of delay lines such as five lines in the field modulation device 2901.

As described above, the optical wavelength multi/demultiplexing circuit 10C of embodiment 3 is a synchronized AWG with a high rectangular transmission loss spectrum that is able to secure loss flatness of the transmission band, maintain/reduce the guard bandwidth of wavelength channel spacing, and broaden the transmission bandwidth.

Note that, as also described above, generally speaking, to further broaden the transmission bandwidth or to further reduce the transition region between wavelength channels, it is preferable to increase the total number of the traverse modes that are controlled by the field modulation device 2901. However, there is a problem in that degree of difficulty at the time of synchronized AWG production increases as the number of optical delay lines in the field modulation device 2601 is increased or the optical delay amount is increased, causing manufacture yield to deteriorate.

However, if the optical wavelength multi/demultiplexing circuit 10C according to embodiment 3 is used, loss flatness of the transmission band, guard bandwidth, transmission bandwidth and the like can be further improved at the same time. Moreover, it becomes possible to also reduce the nonlinearity of transmission phase characteristics at the same time, and to provide a synchronized AWG with a high rectangular transmission loss spectrum, even with a small number of optical delay lines such as five lines.

INDUSTRIAL APPLICABILITY

The present invention can be utilized in optical communication to an optical module, an optical fiber communication system or the like including the optical wavelength multi/demultiplexing circuits 10A, 10B and 10C and the like that were described in the embodiments.

REFERENCE SIGNS LIST

10A Optical wavelength multi/demultiplexing circuit of embodiment 1
10B Optical wavelength multi/demultiplexing circuit of embodiment 2
10C Optical wavelength multi/demultiplexing circuit of embodiment 3
101, 201, 301, 401, 501, 601, 1101, 1201, 1301, 1401, 2601, 2901 Field modulation device
102, 202, 302, 402, 502, 602, 1102, 1202, 1302, 1402, 2602, a 2902 Arrayed waveguide grating
103, 2603, 2903 Common input waveguide
104, 2604, 2904 First optical delay line
105, 2605, 2905 Second optical delay line
106, 2606, 2906 Third optical delay line
107, 2607, 2907 Fourth optical delay line
108, 2608, 2909 Optical branching unit
109, 2609, 2910 First optical branching element
110, 2610, 2911 Second optical branching element
111, 2611, 2912 Third optical branching element
112, 2612, 2914 Multiplex interference unit
113, 2613, 2915 First multiplex interference element
114, 2614, 2916 Second multiplex interference element
115, 2615, 2917 Mode converter/multiplexer
116, 2616, 2918 Input port of mode converter/multiplexer for converting to zero-order traverse mode
117, 2617, 2919 Input port of mode converter/multiplexer for converting to first-order traverse mode
118, 2618, 2920 Input port of mode converter/multiplexer for converting to second-order traverse mode
303, 4032 Directional coupler composed of two proximal waveguides
503 Directional coupler composed of three proximal waveguides
603 Four proximal waveguides
1403 Multimode waveguide unit of MMI
304 Mach-Zehnder interferometer
404 Lattice filter
504 Interference circuit having three delay lines
604 MZI cascaded in a tree structure
1103, 1203, 1303 Multimode waveguide
1104, 1204, 1305 First waveguide port for fundamental mode input to mode converter/multiplexer
1105, 1205, 1305 Second waveguide port for fundamental mode input to mode converter/multiplexer
1106, 1206, 1306 Mode converter/multiplexer
1404 MMI/Phaser
2619, 2921 Input port of mode converter/multiplexer for converting to third-order traverse mode
2908 Fifth optical delay line
2913 Fourth optical branching element
2922 Input port of mode converter/multiplexer for converting to fourth-order traverse mode
S1 Transmission region enlarged view of transmission loss spectrum of optical wavelength multi/demultiplexing circuit 10A of embodiment 1
S2 Transmission region enlarged view of group delay time spectrum of optical wavelength multi/demultiplexing circuit 10A of embodiment 1
S3 General view of transmission loss spectrum of optical wavelength multi/demultiplexing circuit 10A of embodiment 1

S4 Transmission region enlarged view of transmission loss spectrum of optical wavelength multi/demultiplexing circuit 10B of embodiment 2

S5 Transmission region enlarged view of group delay time spectrum of optical wavelength multi/demultiplexing circuit 10B of embodiment 2

S6 General view of transmission loss spectrum of optical wavelength multi/demultiplexing circuit 10B of embodiment 2

S7 Transmission region enlarged view of transmission loss spectrum of optical wavelength multi/demultiplexing circuit 10C of embodiment 3

S8 Transmission region enlarged view of group delay time spectrum of optical wavelength multi/demultiplexing circuit 10C of embodiment 3

S9 General view of transmission loss spectrum of optical wavelength multi/demultiplexing circuit 10C of embodiment 3

The invention claimed is:

1. An optical wavelength multi/demultiplexing circuit comprising:
    an arrayed waveguide grating;
    a field modulation device optically connected to the arrayed waveguide grating; and
    a multimode waveguide for a connecting part between the arrayed waveguide grating and the field modulation device,
    wherein the arrayed waveguide grating includes:
    an arrayed waveguide composed of a plurality of channel waveguides;
    and a slab waveguide connected to the arrayed waveguide,
    the field modulation device includes:
    a common input waveguide;
    2N optical delay lines (N being a positive integer greater than or equal to 2) having mutually different optical delay lengths;
    an optical branching unit configured to distribute signal light output from the common input waveguide to the 2N optical delay lines;
    a multiplex interference unit configured to perform multiplex interference of the 2N beams of signal light output from the optical delay lines and output 2N or 2N−1 beams of the signal light;
    and a mode converter/multiplexer configured to convert and multiplex the 2N or 2N−1 beams of signal light output from the multiplex interference unit in mutually different waveguide traverse modes, and output the multiplexed signal light to the slab waveguide via the multimode waveguide,
    the 2N optical delay lines satisfy a relation $L_i=(i-1)\times\Delta L+L_1+\alpha_i$ ($i>1$), where $\Delta L$ is a predetermined optical delay length difference, $L_i$ is an optical delay length of an ith optical delay line in ascending order of the optical delay length, and $\alpha_i$ is a phase adjustment length of the ith optical delay line,
    the $\alpha_i$ satisfies a relation $-10\times(\lambda/n_e)<\alpha_i<10\times(\lambda/n_e)$, where $\lambda$ is a wavelength of the signal light, and $n_e$ is an effective refractive index of the optical delay line, and
    an optical frequency repetition period of the field modulation device determined by the $\Delta L$ is consistent with an integer multiple of a channel spacing of the arrayed waveguide grating,
    wherein the multiplex interference unit includes N two-input two-output multiplex interference elements or N−1 two-input two-output multiplex interference elements and one two-input one-output multiplex interference element,
    wherein signal light output from an N+1-jth line (j being a positive integer from 1 to N inclusive) of the optical delay lines in ascending order of the optical delay length and signal light output from an N+jth line of the optical delay lines in ascending order of the optical delay length, out of the 2N beams of signal light output from the optical delay lines, are guided to inputs of the two-input two-output multiplex interference elements, and $\alpha_{N+1-j}$ and $\alpha_{N+j}$ are set such that one of the two outputs of the two-input two-output multiplex interference elements is an intensity maximum at a center wavelength $\lambda c$ of the optical frequency repetition period of the field modulation device, and
    wherein if j<N, output that is the intensity maximum at the $\lambda c$ is guided to an input port for converting to a 2j−2th order traverse mode, out of input ports of the mode converter/multiplexer, and other output is guided to an input port of the mode converter/multiplexer for converting to a 2j−1th order traverse mode, and
    if j=N, output that is the intensity maximum at the $\lambda c$ is guided to an input port for converting to a 2N−2th order traverse mode out of the input ports of the mode converter/multiplexer.

2. The optical wavelength multi/demultiplexing circuit according to claim 1,
    wherein all merging ratios of the multiplex interference elements included in the multiplex interference unit are 50:50, and an intensity of light distributed by the optical branching unit to two of the optical delay lines configured to output signal light that is to undergo multiplex interference is an equal distribution ratio.

3. The optical wavelength multi/demultiplexing circuit according to claim 2,
    wherein there are four of the optical delay lines, and
    a distribution ratio of the optical branching unit that distributes signal light to a first optical delay line, a second optical delay line, a third optical delay line and a fourth optical delay line out of the four optical delay lines in ascending order of the optical delay length is $\delta$:50%−$\delta$:50%−$\delta$:$\delta$ ($\delta$ being from 3% to 13% inclusive).

4. The optical wavelength multi/demultiplexing circuit according to claim 2,
    wherein there are five of the optical delay lines, and
    a distribution ratio of the optical branching unit that distributes signal light to a first optical delay line, a second optical delay line, a third optical delay line, a fourth optical delay line and a fifth optical delay line out of the five optical delay lines in ascending order of the optical delay length is $\gamma$:$\delta$:100%−2$\delta$−2$\gamma$:$\delta$:$\gamma$ ($\gamma$ being not greater than 3%, and $\delta$ being from 15% to 30% inclusive).

5. An optical wavelength multi/demultiplexing circuit comprising:
    an arrayed waveguide grating and a field modulation device optically connected to the arrayed waveguide grating;
    and, a multimode waveguide for a connecting part between the arrayed waveguide grating and the field modulation device,
    wherein the arrayed waveguide grating includes:
    an arrayed waveguide composed of a plurality of channel waveguides;
    and a slab waveguide connected to the arrayed waveguide, the field modulation device includes:

a common input waveguide;

2N+1 optical delay lines (N being a positive integer greater than or equal to 2) having mutually different optical delay lengths;

an optical branching unit configured to distribute signal light output from the common input waveguide to the 2N+1 optical delay lines;

a multiplex interference unit configured to perform multiplex interference of the 2N+1 beams of signal light output from the optical delay lines and output 2N+1 or 2N beams of the signal light;

and a mode converter/multiplexer configured to convert and multiplex the 2N+1 or 2N beams of signal light output from the multiplex interference unit in mutually different waveguide traverse modes, and output the multiplexed signal light to the slab waveguide via the multimode waveguide, the 2N+1 optical delay lines satisfy a relation $L_i=(i-1)\times \Delta L+L_1+\alpha_i (i>1)$, where $\Delta L$ is a predetermined optical delay length difference, $L_i$ is an optical delay length of an ith optical delay line in ascending order of the optical delay length, and $\alpha_i$ is a phase adjustment length of the ith optical delay line, the $\alpha_i$ satisfies a relation $-10\times(\lambda/n_e)<\alpha_i<10\times(\lambda/n_e)$, where $\lambda$ is a wavelength of the signal light, and $n_e$ is an effective refractive index of the optical delay line, and an optical frequency repetition period of the field modulation device determined by the $\Delta L$ is consistent with an integer multiple of a channel spacing of the arrayed waveguide grating, wherein the multiplex interference unit includes N two-input two-output multiplex interference elements or N−1 two-input two-output multiplex interference elements and one two-input one-output multiplex interference element, wherein signal light output from an N+1-jth line (j being a positive integer from 1 to N inclusive) of the optical delay lines in ascending order of the optical delay length and signal light output from an N+1+jth line of the optical delay lines in ascending order of the optical delay length, out of the 2N beams of signal light output from the optical delay lines, are guided to inputs of the two-input two-output multiplex interference elements, and $\alpha_{N+1-j}$ and $\alpha_{N+1+j}$ are set such that one of the two outputs of the two-input two-output multiplex interference elements is an intensity minimum at a center wavelength $\lambda c$ of the optical frequency repetition period of the field modulation device, and wherein if j<N, output that is the intensity minimum at the $\lambda c$ is guided to an input port for converting to a 2j−1th order traverse mode out of input ports of the mode converter/multiplexer, and other output is guided to an input port of the mode converter/multiplexer for converting to a 2jth order traverse mode, if j=N, output that is the intensity minimum at the $\lambda c$ is guided to an input port for converting to a 2j−1th order traverse mode out of the input ports of the mode converter/multiplexer, and if j=0, signal light output from an N+1th line of the optical delay lines in ascending order of the optical delay length is guided to an input port for converting to a zero-order traverse mode out of the input ports of the mode converter/multiplexer.

6. The optical wavelength multi/demultiplexing circuit according to claim 5, wherein all merging ratios of the multiplex interference elements included in the multiplex interference unit are 50:50, and an intensity of light distributed by the optical branching unit to two of the optical delay lines configured to output signal light that is to undergo multiplex interference is an equal distribution ratio.

7. The optical wavelength multi/demultiplexing circuit according to claim 6, wherein there are four of the optical delay lines, and a distribution ratio of the optical branching unit that distributes signal light to a first optical delay line, a second optical delay line, a third optical delay line and a fourth optical delay line out of the four optical delay lines in ascending order of the optical delay length is $\delta$:50%−$\delta$:50%−$\delta$:$\delta$ ($\delta$ being from 3% to 13% inclusive).

8. The optical wavelength multi/demultiplexing circuit according to claim 6, wherein there are five of the optical delay lines, and a distribution ratio of the optical branching unit that distributes signal light to a first optical delay line, a second optical delay line, a third optical delay line, a fourth optical delay line and a fifth optical delay line out of the five optical delay lines in ascending order of the optical delay length is $\gamma$:$\delta$:100%−2$\delta$−2$\gamma$:$\delta$:$\gamma$ ($\gamma$ being not greater than 3%, and $\delta$ being from 15% to 30% inclusive).

* * * * *